US010158583B2

(12) United States Patent
Rao et al.

(10) Patent No.: US 10,158,583 B2
(45) Date of Patent: Dec. 18, 2018

(54) VIRTUAL NETWORK FUNCTION STATE SCALING

(71) Applicants: Jaya Rao, Ottawa (CA); Xu Li, Nepean (CA)

(72) Inventors: Jaya Rao, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 15/072,801

(22) Filed: Mar. 17, 2016

(65) Prior Publication Data
US 2017/0272380 A1 Sep. 21, 2017

(51) Int. Cl.
*H04L 12/911* (2013.01)
*G06F 17/27* (2006.01)

(52) U.S. Cl.
CPC ............ *H04L 47/823* (2013.01); *G06F 17/27* (2013.01)

(58) Field of Classification Search
CPC ..................................................... H04L 47/823
USPC ........................................................ 709/226
See application file for complete search history.

(56) References Cited

U.S. PATENT DOCUMENTS

| 2006/0265209 | A1* | 11/2006 | Bradford | ............. | G06F 17/2809 |
| | | | | | 704/9 |
| 2012/0057456 | A1* | 3/2012 | Bogatin | ................ | H04W 28/08 |
| | | | | | 370/230.1 |
| 2013/0232487 | A1 | 9/2013 | Lee et al. | | |

FOREIGN PATENT DOCUMENTS

| CN | 103618627 A | 3/2014 |
| CN | 104980297 A | 10/2015 |
| WO | 2015131671 A1 | 9/2015 |

OTHER PUBLICATIONS

International Search Report dated Nov. 25, 2016 for corresponding International Application No. PCT/CN2016/082157 filed May 14, 2016.
ETSI GS NFV-SWA 001 v1.1.1 "Networked Functions Virtualisation (NFV); Virtual Network Functions Architecture", Dec. 2014, section 6.

* cited by examiner

*Primary Examiner* — Hua Fan

(57) ABSTRACT

A method and apparatus for scaling a VNF on a first PoP associated with at least one wireless device (WD) to a second PoP. A probabilistic estimate of a likelihood that the WD(s) will be handed over to at least one candidate PoP is generated and a VNF state associated with such candidate(s) is scaled and populated with state context information related to a handover of the WD(s) from the first PoP to the candidate(s). The second PoP is identified from the candidate(s) prior to handover using the probabilistic estimate. Thereafter the VNF is scaled from the first PoP to the second PoP, followed by handover of the WD(s) from the first PoP to the second PoP.

15 Claims, 17 Drawing Sheets

VIRTUAL NETWORK FUNCTION STATE SCALING

TECHNICAL FIELD

The present disclosure relates to network function virtualization and in particular to a method and apparatus for scaling a state of a virtual network function (VNF) independently of the function itself.

BACKGROUND

The demand for network resources in terms of bandwidth, computing power and storage capacity is ever increasing. One approach under consideration to meet this increasing demand is through network function virtualization (NFV), in which pooled network resources, which comprise a NFV infrastructure (NFVI), are used to scale appropriate VNFs, for example from cloud-based resources, on one or more existing network nodes or Points-of-Presence (PoP) to provide a dynamic service level capability as and when appropriate.

In some cases, the nature of the VNF is such that it interacts with one or more wireless devices (WD), which may be Machine-Type Communications (MTC) devices (MTCDs) that communicate with other devices or with applications running on remote servers. MTC may be differentiated from Human-Type Communications (HTC) such as voice and data communications using smartphones, laptops or tablets, in that MTC traffic may be generally characterized as being sporadic and low-bandwidth, while HTC traffic may be characterized as involving a substantially incessant demand for high bandwidth. Thus, MTC traffic may typically involve the exchange of a few small packets in very short-lived (relative to HTC communications) packet flows. Moreover, MTC communications systems may be differentiated from HTC systems in that it is anticipated, and taken into account in network design, that there will be a very large number of MTCDs (relative to HTC devices) within a network coverage area.

In some cases, such as in the context of Mobile Edge Computing (MEC) applications, the WDs, such as unmanned aerial vehicles (UAVs) also known as drones, and self-driving cars, interacting with a VNF are geographically mobile. In such cases, the corresponding VNF can provide a distributed computing service with an ability to process and store WD-related data while located in proximity to one or more WDs. Accordingly, the scaling of a VNF at a given PoP to serve one or more of the WDs may only be appropriate for a brief period of time as WDs move in and out of a network coverage area served by the PoP.

Scalability is the capability of an entity, such as a VNF, to increase and/or decrease in size, extent or capability. In the context of a VNF, there may be horizontal (scaling out and/or in) and/or vertical (scaling up and/or down) of VNF capability. Horizontal scalability refers to the increase and/or decrease in the number of PoPs in which the VNF instance is implemented. Vertical scalability refers to the increase and/or decrease in the number of VNF instances implemented within a given PoP. Migration refers to the movement of VNF functionality from a given PoP to another PoP and may be considered to be a subset of horizontal scaling in which the VNF instance is scaled out to the second PoP and scaled in from the first PoP.

Thus, a VNF in an MEC application that supports mobile WDs may be scaled to other PoPs along a path that tracks the geographic trajectory followed by mobile WDs over time, in order to ensure that the VNF remains in sufficient proximity to such mobile WDs in order to continue to support them.

In some cases, the VNF may support a mission-critical use case, such as providing an application-specific (A-S) command and control (CnC) function for such mobile WDs, performing a task, either alone or collaboratively, such as, by way of non-limiting example, target tracking, object retrieval and/or rescue operations).

Such an A-S VNF may receive and process uplink (UL) data flows from the WD, such as, in the context of the example mission-critical MEC use case described above, telemetry (positioning, velocity, acceleration), resource status (battery, armament, error conditions) and target monitoring, and generate and transmit downlink (DL) data flows to the WD in response, such as navigational and/or guidance information and actuator responses, often in consultation with or reporting to and/or under the direction of a remote application function (AF).

Such mission-critical use cases may be characterized by demands such as ultra-low latency and/or ultra-high reliability while scaling the A-S VNF to PoPs to maintain a minimum round trip time (RTT) between uplink and downlink transmissions. Additionally, the A-S VNF for a PoP may have a VNF controller state $S(D, t_s, t_s+\Delta t_l)$ that depends upon the UL data flows from and the DL data flows to the WD (including the content and/or context $D_j$ (j=1 . . . k) of each data flow to and/or from each $WD_j$ (collectively D), which may comprise the VNF state-life start time $t_s$ and/or its end time $t_s+\Delta t_l$ (where $\Delta t_l$ is the state-life duration), especially in the UL direction.

In such scenarios, simply horizontally scaling the A-S VNF and its state along a path that tracks the geographic trajectory of the mobile WDs may not satisfy the constraints of such mission-critical use cases.

For example, the trajectory of the mobile WDs may not be known in advance. Thus, potential PoPs will be proactively identified, many of which may never be scaled, as the actual trajectory becomes apparent, resulting in significant over-provisioning of network resources.

Further, scaling of A-S VNFs may involve life-cycle (On-boarding, Instantiation, Configuration, Activation, Termination) management of the A-S VNF within each PoP that is determined to be appropriate. On-boarding involves the download, usually from a remote node, of a software image that implements the VNF functionality onto the PoP and reserving or having allocated to it sufficient data storage resources to store the on-boarded software image. Instantiation involves the initiation of the software and the reserving or having allocated to the PoP sufficient computational resources to run the software so that it is ready to be activated. Configuration involves configuring the VNF parameters to ensure the VNF is ready to execute the software. Activation involves reserving or having allocated to the PoP sufficient memory resources to execute the software and actually executing the software. Typically, the on-boarding and instantiation stages are the most time-intensive. Consequently, reactively performing life-cycle management over such PoPs, may introduce high latency to the VNF that may not be acceptable.

Still further, when scaling the VNF between PoPs, the VNF state should be preserved throughout.

When the VNF state is scaled with the A-S VNF, the entire state contents are copied and transmitted, whether proactively or reactively, to each PoP to which the A-S VNF is or may be scaled as may be determined to be appropriate. In order to maintain state consistency at all PoPs, this may be repeated every time the VNF state is updated (for example, upon each UL or DL data flow through Access Points (APs) linking the WD and the A-S VNF). This may consume huge amounts of network resources and may result in overhead signalling storms.

While this may be achievable in a local-area network (LAN) characterized by a common data center (DC), it may be much more challenging to preserve the VNF state with the desired high reliability in a wide-area network (WAN) environment in which such scenarios would operate.

As an alternative to scaling the A-S VNF together with its VNF state as described above, the European Telecommunications Standards Institute (ETSI) has proposed (ETSI GS NFV-SWA 001 v1.1.1 "Networked Functions Virtualisation (NFV); Virtual Network Functions Architecture", December, 2014, section 6) decoupling the VNF state from the A-S VNF and managing the A-S VNF as stateless. In so doing, the VNF state can be managed and/or updated externally and accessed by all other instances of the A-S VNF on a PoP. The ETSI proposal contemplates off-line migration of the A-S VNF, in effect terminating the A-S VNF at one (source, serving or upstream) PoP and commencing life-cycle management at a new (destination or downstream) PoP.

However, such decoupling of the VNF state from the A-S VNF may not be suitable for the mission-critical use case described above, since the data flows to update the state upon each UL and/or DL data flow may result in excessive delay that may violate the ultra-low latency constraint. Further, since all VNF state updates are communicated to the PoP upon which the VNF state is instantiated, a single point of failure is introduced, which may violate the ultra-high reliability constraint.

Moreover, the specifics related to interworking with a tracking entity that monitors the location of the WD is not defined, nor are there specifics related to interworking with a VNF Manager (VNFM) for VNF life-cycle and state management.

Other proactive VNF lifecycle management solutions to support WDs have been proposed. However, these may not be suitable for mission-critical use cases since they generally assume that the trajectory of the WDs is known a priori and employ off-line scaling techniques involving high resource provisioning.

BRIEF DESCRIPTION OF THE DRAWINGS

Example embodiments of the present disclosure will now be described by reference to the following figures, in which identical reference numerals in different figures indicate identical elements and in which.

Figure 1:
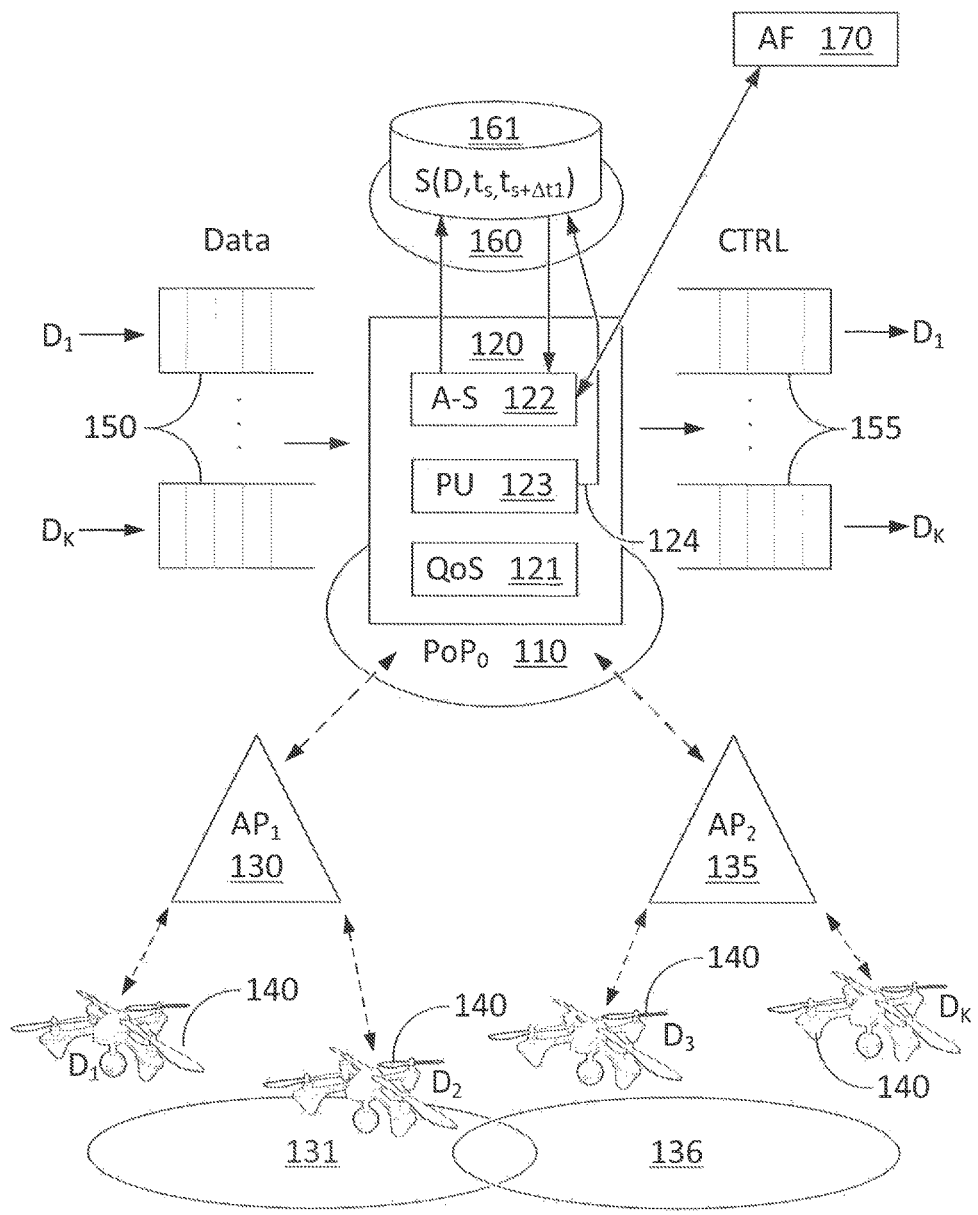
FIG. 1 is an example block diagram in the data plane of an example PoP on which an A-S VNF and its corresponding VNF state have been activated to support one or more WD in an example use case.

In the present disclosure, for purposes of explanation and not limitation, specific details are set forth in order to provide a thorough understanding of the present disclosure. In some instances, detailed descriptions of well-known devices, circuits and methods are omitted so as not to obscure the description of the present disclosure with unnecessary detail.

SUMMARY

The present disclosure discloses scaling a VNF state to potential PoPs separately from the underlying A-S VNF functionality. PoPs to which the A-S VNF functionality (and its associated VNF state) are scaled out may be proactively identified using probabilistic information, such as information about the trajectory of the WD being supported. As the probabilistic information matures, certain proactively-identified PoPs may be discarded in favour of other PoPs, in association with which the VNF state is already activated. Thus, when the A-S VNF is ultimately scaled on a PoP, the VNF state has already been established.

In some example embodiments, the VNF state scaling may be achieved in a loss-free, efficient and decentralized manner while maintaining consistency of the VNF by preprocessing and fragmenting the state information by each upstream PoP for export and assembly by multiple potential downstream PoPs. This promotes compliance with delay constraints while observing established software-defined networking (SDN) principles and interactions between the VNF and Management and Orchestrator (MANO) components.

The disclosed embodiments facilitate timely processing of data flows from and to the WD while enhancing service-related Quality of Service (QoS) and/or Quality of Experience (QoE) and promoting efficient utilization of PoP and network resources such as minimizing packet buffering and the use of computation resources at gateway (GW) functions.

As well, the disclosed embodiments permit enhanced VNF life-cycle management while providing foresight into resource usage for improving VNF scheduling performance.

According to an example embodiment of the present disclosure there is disclosed a method for scaling a VNF, having a VNF state, the VNF activated on a first PoP associated with at least one WD. The method comprises generating at least one probabilistic estimate of a likelihood that the association of the at least one WD will be changed to at least one candidate PoP, proactively scaling the VNF state on a PoP associated with the at least one candidate PoP, proactively selecting the at least one candidate PoP using the probabilistic estimate, activating a VNF on the at least one candidate PoP after said selecting, and changing the association of the at least one WD from the first PoP to the at least one candidate PoP after said activating.

The method can populate the VNF state with state context information related to said changing the association.

The action of generating can obtain information related to a trajectory of the at least one WD from the VNF on the first PoP and/or correlate the trajectory information with information related to the at least one candidate PoP.

The action of proactively scaling can comprise performing an action selected from a group consisting of on-boarding, instantiating, configuring and/or activating in respect of a VNF on a PoP associated with the at least one candidate PoP. The VNF state can be an external VNF scaled onto the PoP associated with the at least one candidate PoP. The PoP associated with the at least one candidate PoP can be the at least one candidate PoP. The VNF state can be a component of the VNF that is scaled from the first PoP to the at least one candidate PoP.

The action of populating can decompose the state context information of the VNF on the first PoP into a plurality of fragments and forward at least one fragment to the VNF state associated with the at least one candidate PoP and/or assemble a plurality of fragments of the state context information into a state context for the at least one candidate PoP.

The action of selecting can compare the probabilistic estimate of the at least one candidate PoP against a policy. The policy can be a threshold value such that the at least one candidate PoP is selected if its probabilistic estimate exceeds the threshold value.

The method can deactivate the VNF on the first PoP.

The association of the at least one WD to a PoP can be through an AP. The change of association can be handing over the at least one WD from an AP associated with the first PoP to an AP associated with the at least one PoP.

According to an example embodiment of the present disclosure there is disclosed a VNF on a first PoP associated with at least one WD for scaling to at least one candidate PoP to whom the association of the at least one WD will be changed. The VNF comprises an A-S function and a PU function. The A-S function processes data flows from and generates data flows to the at least one WD, exchanges VNF state information with a state database associated with the first PoP and derives data flow context information. The PU function generates a probabilistic estimate of a likelihood that the association of the at least one WD will be changed to the at least one candidate PoP, exchanges VNF state information with the state database and communicates a trigger related to the probabilistic estimate to a manager remote from the first PoP. The manager causes the state database to scale a VNF state on a PoP associated with the at least one candidate PoP and populate it with state context information related to a change of association of the at least one WD from the first PoP to the at least one candidate PoP, prior to activating a VNF on a selected one of the at least one candidate PoP, established from the first PoP and and prior to changing the association of the at least one WD from the first PoP to the selected candidate PoP.

According to an example embodiment of the present disclosure there is disclosed a state database associated with a VNF on a first PoP associated with at least one WD. The state database comprises state context information related to data flows exchanged between an A-S function of the VNF and the at least one WD and probabilistic estimates, of a likelihood that the association of the at least one WD will be changed to at least one candidate PoP. The probabilistic estimates are communicated to a manager remote from the first PoP. The manager causes the state database to scale a VNF state on a PoP associated with the at least one candidate PoP, prior to activating a VNF on the at least one candidate PoP and prior to changing the association of the at least one WD from the first PoP to the at least one candidate PoP.

The PoP associated with the first PoP can be the first PoP. The PoP associated with the at least one candidate PoP can be the at least one candidate PoP.

According to an example embodiment of the present disclosure there is disclosed a VNF state scaling manager on a PoP associated with a first PoP, for supporting scaling of a VNF state of a VNF on the first PoP associated with at least one WD. The VNF state scaling manager comprises a pre-processor, a scheduler and a VNF state analyzer. The pre-processor generates at least one state fragment of the VNF state for scaling to a VNF state associated with the VNF on a selected one of the at least one candidate PoPs to which the association of the at least one WD will be changed. The scheduler exports the at least one state fragment in accordance with a state fragmentation schedule. The VNF state analyzer processes content of the VNF state associated with the VNF on the first PoP.

According to an example embodiment of the present disclosure there is disclosed a VNF state scaling manager on a PoP associated with at least one candidate PoP, for supporting scaling of a VNF state of a VNF on a first PoP associated with at least one WD. The VNF state scaling manger comprises a post-processor, a scheduler and a VNF state analyzer. The post-processor assembles at least one state fragment of the VNF state received from the PoP associated with the first PoP. The scheduler imports the at least one state fragment in accordance with a state fragmentation schedule. The VNF state analyzer processes content of the VNF state associated with the VNF on the at least one candidate PoP.

According to an example embodiment of the present disclosure there is disclosed a computer program product having a computer program stored thereon, containing computer-readable program instructions that, when executed by a processing unit on a first PoP associated with at least one WD, cause the processing unit to scale a VNF on the first PoP The instructions cause the processing unit to perform actions of generating a probabilistic estimate of a likelihood that the association of the at least one WD will be changed to at least one candidate PoP, communicating the probabilistic estimate to a manager remote from the first PoP to trigger scaling of a VNF state on the at least one candidate PoP, proactively selecting the at least one candidate PoP fusing the probabilistic estimate, causing the manager to activate a VNF on the at least one candidate PoP and changing the association of the at least one WD from the first PoP to the second PoP after the VNF has been activated.

DESCRIPTION

Methods and systems for efficiently (in terms of RTT latency and reliability) scaling stateful A-S VNFs to multiple PoPs that may serve WDs in a chronological order are desirable.

While the present disclosure is described in the context of an example mission-critical MEC use case involving CnC of MTCDs, those having ordinary skill in this art will appreciate that the present disclosure may be equally applicable in the context of other use cases involving WD interacting with an AF through an A-S VNF that may be scaled based on probabilistic estimates. Such scenarios include, without limitation, load-balancing, mobile cloud networks and mobile agents.

In some example embodiments, the WD may or may not be mobile or MTCDs and the probabilistic estimates may reflect geographical trajectories, network loading constraints and/or other factors that may impact the identification of destination PoP candidate(s) to which the A-S VNF may or may not be scaled.

Turning now to FIG. 1, there is shown a block diagram in the data plane, which bears the traffic that the network exists to carry, of an example PoP on which a VNF and its corresponding VNF state (in the form of a VNF) have been activated to support a WD. The PoP 110, has associated therewith at least one VNF 120, an associated VNF state database 161 defining the VNF state, at least one AP 130, 135, at least one WD 140 and an AF 170 that handles operations between the WD140 and back-end applications or databases through the VNF 120.

At any given time, the WD140 is geographically located in a space associated with at least one of the APs 130, 135, as shown by regions 131, 136 respectively, which may in some example embodiments overlap. The WD140 communicates with the VNF 120 through the AP 130, 135 associated with the region 131, 136 in which it is currently located.

The VNF 120 accepts UL data flows 150 from the WD140 and generates DL data flows 155 to the WD140.

Further, the VNF 120 periodically updates the state database 161 and periodically retrieves information from the state database 161 and periodically transmits information to and receives information from the AF 170.

The VNF 120 may comprise a plurality of VNF components (VNFCs) 121-123. For the purpose of the present discussion, the terms VNFC and VNF may be used interchangeably to refer to a VNFC. In some example embodiments, the VNFCs 121-123 may comprise one or more conventional functions that would typically be found in most VNFs 120, such as a Quality of Service (QoS) function 121. In some example embodiments, the VNFCs are co-located on a common PoP 100.

Additionally, the VNFCs 121-123 may comprise one or more service-related functions that are specific to the particular VNF 120 and the AF 170, including an A-S VNF 122 and a probabilistic updater (PU) function 123 updating a trajectory.

The A-S VNF 122 performs control processing associated with the WD140 that it serves. By way of non-limiting example related to the mission-critical MEC use case described above, the A-S VNF 122 may perform a CnC function which may include monitoring the geographical location of the WD140 and of its target(s), updating mission parameters and objectives and monitoring a mission status.

In so doing, the A-S VNF 120 receives the UL data flows 150 from the WD140 and generates and transmits the DL data flows 155 to the WD140 in response. By way of non-limiting example, the UL data flows 150 may comprise data such as telemetry (positioning, velocity, acceleration), resource status (battery, armament, error conditions) and target monitoring. By way of non-limiting example, the DL data flows 155 may comprise navigational and/or guidance information and actuator responses.

Additionally, the A-S VNF 122 updates the state database 161 with new state information based on received UL data flow(s) 150 and generates and transmits DL data flow(s) 155, and retrieves updated state information from the state database 161 as appropriate. Further, the A-S VNF 122 provides inputs, such as data flow context information, to the PU function 123 that allows it to generate probabilistic estimates of likelihoods as to which PoP(s) to which the association WD 140 will be changed. Where the association is changed, VNF 120 is scaled out. Still further, the A-S VNF 122 exchanges information with the AF 170.

The PU function 123 generates probabilistic estimates and updates the state database 161 with such estimates 124, which may be employed to determine which destination PoP(s) may shortly scaled out with the A-S VNF 122 and when, and when the source PoP 100 may be deactivated. The PU function 123 generates such estimates from inputs received from the A-S VNF 122, inputs received from the AF 170, as well as state information from the state database 161. By way of non-limiting example, the inputs may comprise telemetry updating the position, velocity and acceleration of the WD140 or the underlying UL data flow(s) 150 themselves, from which the PU function 123 may derive such information, which may permit the PU function 123 to maintain and continually update the trajectory of the WD140, from which, in conjunction with information regarding the location of additional PoP(s) and resource allocations and loading of such PoP(s), the destination PoP candidate(s) may be identified to be scaled out.

The state database 161 is a VNFC that defines the VNF state $S(D, t_s, t_s+\Delta t_j)$ of the A-S VNF 122 and maintains state information specific to the A-S VNF 122. In some example embodiments, the state database 161 may comprise an external VNF 160 (as shown). In some example embodiments, the state database 161 may be a VNFC of the VNF 120 (not shown). In some example embodiments, the state database 161 may be situated on the PoP 100. In some example embodiments, the state database 161 may be situated on a PoP 160 that is external to but associated with the PoP 100. The state database 161 is updated periodically by the A-S VNF 122. Additionally, the state database 161 is periodically updated with probabilistic estimates 124 generated by the PU function 123. Periodically, the state database 161 is accessed by the A-S VNF 122 and/or the PU function 123 to retrieve the updated state.

Figure 2:
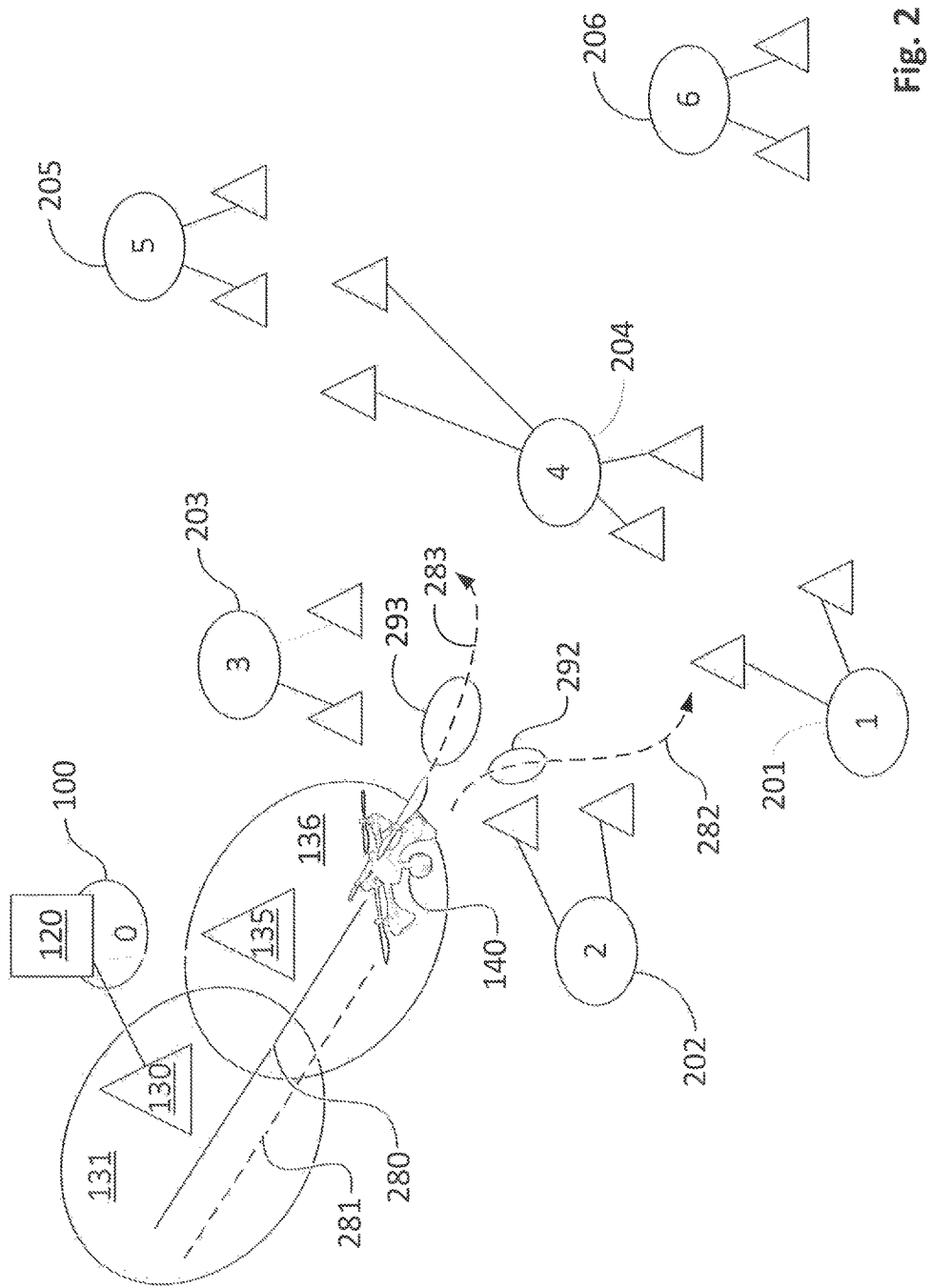
FIG. 2 is an example block diagram showing positioning of example PoPs an example past trajectory followed by a WD at a first point in time while being supported by the A-S VNF of FIG. 1 and probabilistic estimates of its future trajectory path.

FIG. 2, with reference to FIG. 1, shows, by way of non-limiting example, a physical environment in which the example mission-critical MEC CnC scenario discussed above may take place. PoP$_0$ 100, on which the VNF 120 (in the form of inter alia, the A-S VNF 122 and PU function 123) is currently scaled, has associated therewith, APs 130, 135. In addition to PoP$_0$ 100, there are shown a number of other PoPs 201-205, each with associated APs to which the VNF 120 has not already been scaled. Those having ordinary skill in this art will appreciate that some of these PoPs 201-205 may have instantiated thereon other VNFs (not shown) and may or may not have capacity for the A-S VNF 122 to be scaled out thereon.

While the WD 140 passes along its trajectory 280, associated with PoP$_0$ 100, it provides UL data flows 150 to and obtains DL data flows 155 from the A-S VNF 122 through either or both of the APs 130, 135 associated with PoP$_0$ 100. Data flow 150 provides information as to the trajectory 280 of the WD 140, which the A-S VNF 122 passes on to the PU function 123.

As a result, the PU function 123, which is constantly updated with information as to the trajectory 280, estimates and tracks the actual trajectory 280 with a trajectory path 281. Further, the PU function 123 is able to postulate, and in some example embodiments weigh the probability on an ongoing basis, that the trajectory 280 will continue along one of a plurality of potential future trajectory paths 282, 283 ("probabilistic estimates") and updates the state database 161 with such estimates.

Figure 3:
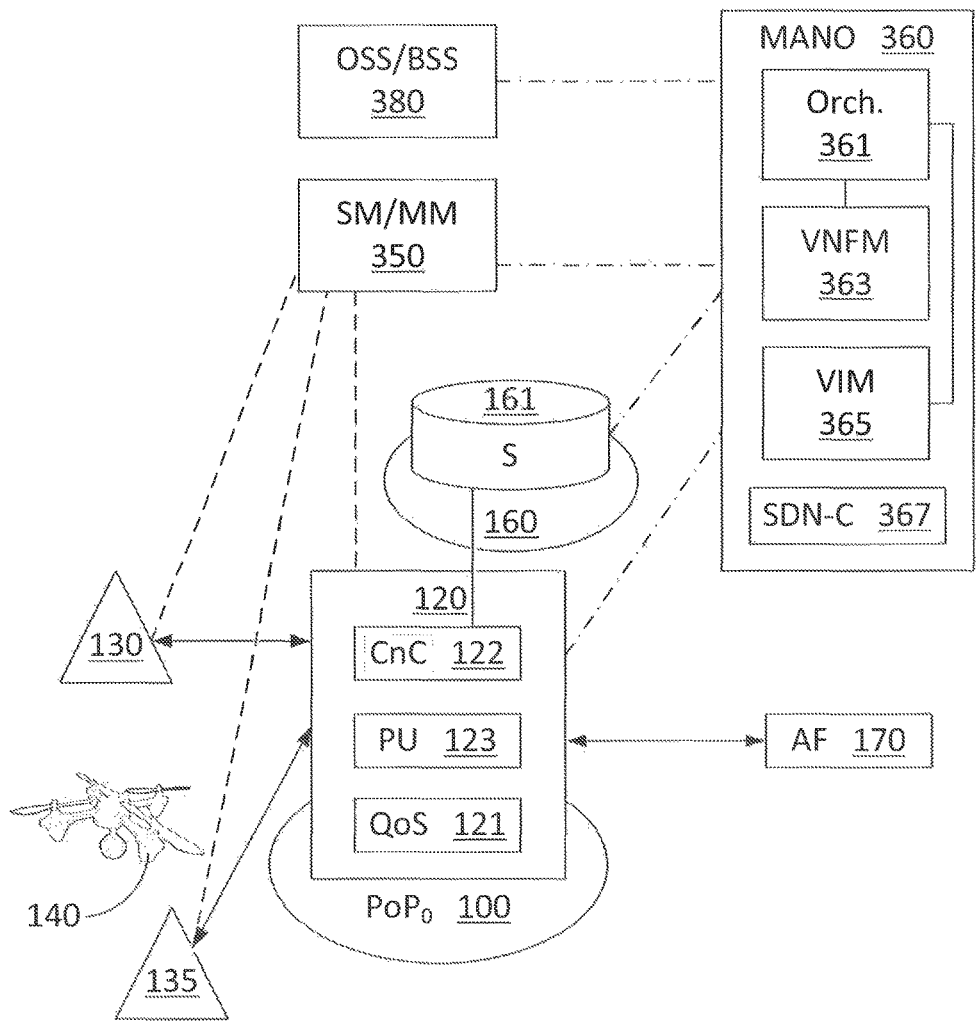
FIG. 3 is an example block diagram in the data and control planes of the example PoP of FIG. 1.

Turning now to FIG. 3, there is shown a block diagram in both the data plane (previously shown in FIG. 1) as well as the control plane, which is the part of a network that carries signalling traffic and is responsible for routing, in the logical topology of a service supported by the AF 170 and the A-S VNF 122, established after service initialization. The diagram shows the AF 170, data plane service-related functions such as the A-S VNF 122 and PU function 123 (as well as conventional functions such as the QoS function 121) of the VNF 120. The data plane service-related functions are scaled on the source PoP$_0$ 100 and currently serve the WD 140 through at least one AP 130, 135, and also serve the state database 161 (in some example embodiments, located on an external PoP 160) associated with PoP$_0$ 100, as shown in FIG. 1, and serving a control plane service-related function such as a Session Manager/Mobility Manager (SM/MM) 350.

The diagram also shows a MANO module 360, which in some example embodiments may comprise one or more of an orchestrator 361, VNFM 363, Virtual Infrastructure Manager (VIM) 365 and an SDN controller (SDN-C) 367, as well as an operations support systems (OSS)/business support systems (BSS) module 380 that supports management functions such as, by way of non-limiting example, network inventory, service provisioning and fault management. The SDN-C 367 is responsible for determining and enforcing the flow-level forwarding rules on SDN-enabled routers in the network. The OSS/BSS module 380 may contain operational-related details pertaining to the WD 140 such as, by way of non-limiting example, trajectory or mobility schedule, which may be used by the orchestrator 361 in identifying suitable PoP candidates for scaling the A-S-VNF 122 as discussed later.

Referring back to FIG. 2, based on the probabilistic estimates stored in the state database 161 associated with the serving VNF 120, the MANO 360 determines that PoP$_2$202, PoP$_3$203, corresponding respectively to trajectory paths 282, 283, may potentially be appropriate to scale out the A-S VNF 122 in order to support the WD 140 as it continues along its trajectory 270 beyond the geographical region 131, 136 that may be supported by the APs 130, 135 associated with PoP$_0$ 100 and may identify a handover waypoint 292, 293 at which support of the WD 140 may be handed off between the source PoP$_0$ 100 and each of destination PoP candidates PoP$_2$ 202, PoP$_3$ 203. Those having ordinary skill in this art will appreciate that in some example embodiments, a single handover waypoint (not shown) may be identified for handover of the WD 140 between the source PoP$_0$ 100 and the destination PoP candidates PoP$_2$ 202, PoP$_3$ 203, irrespective of which PoP 202, 203 is ultimately scaled out with the A-S VNF 122.

Intra-Pop Domain Handover

In some example embodiments, the probabilistic estimate updates generated by the PU function 123 may determine that the WD 140 may have been or is passing from a region 131 associated with a first AP 130 to a region 136 associated with a second AP 135, both of which remain associated with a common PoP 100 and its associated A-S VNF 122.

Figure 4:
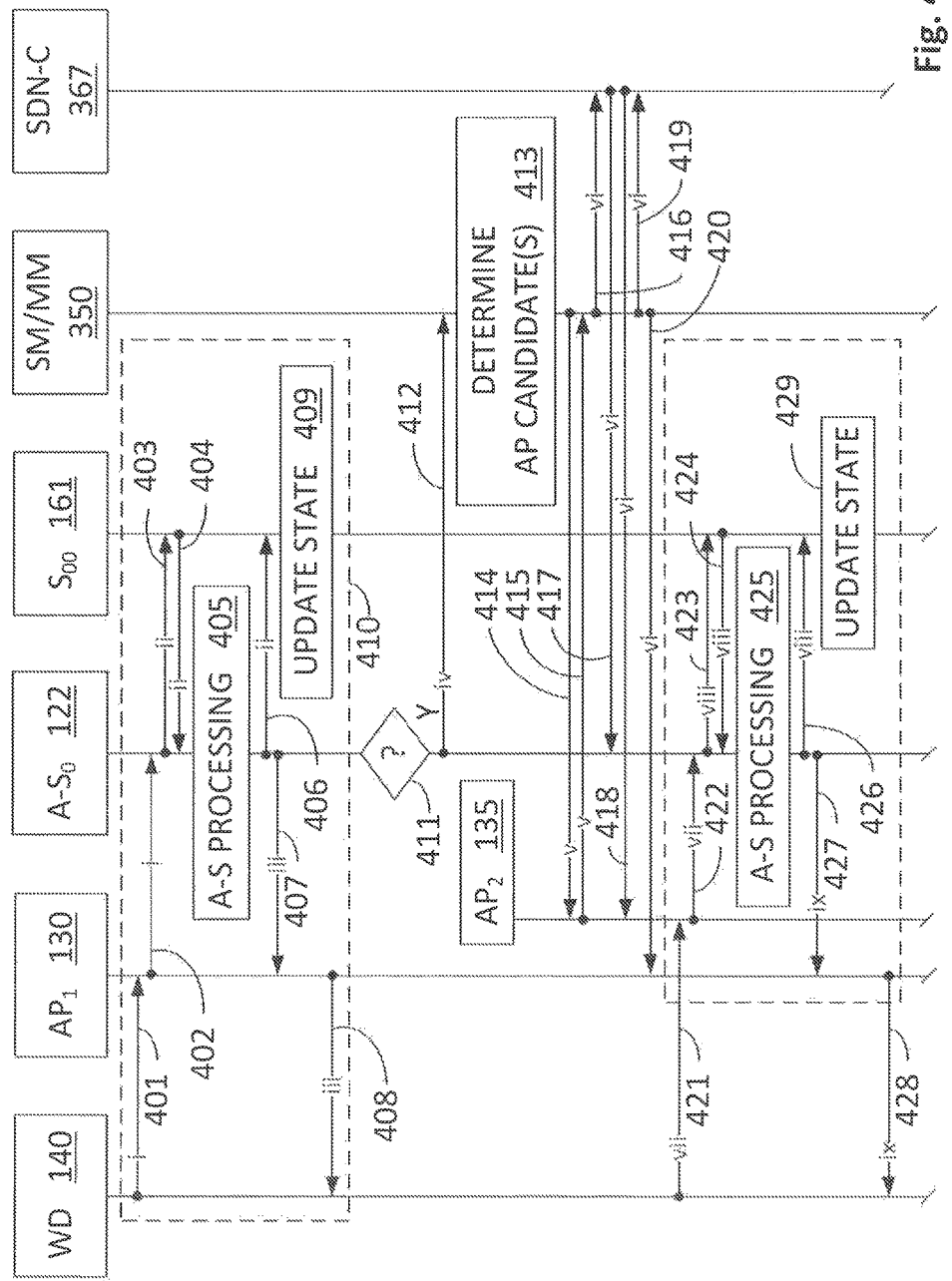
FIG. 4 is an example message flow diagram for the components of FIG. 3 in the context of an example intra-PoP domain handover scenario.

In such a scenario, the state database 161 is updated to reflect a handover, but such handover does not involve the scaling of the VNF state, nor of the A-S VNF 122. Such a handover is denoted as an intra-PoP domain handover. An example message flow diagram illustrating such a scenario is shown in FIG. 4. The identification of one or more flows with a common lower case roman numeral in such diagrams serve to indicate that all such flows are logically associated with one another.

Initially, WD 140 is served by VNF$_0$ 120 comprising A-S VNF A-S$_0$ 122 (and PU function PU$_0$ 123 although it is not involved in the scenario being described) on PoP$_0$ 100 through a first AP (designated AP$_1$) 130 and its associated state database S$_{00}$ 161.

When the WD 140 uploads 401 data to AP$_1$ 130, this data is forwarded 402 by AP$_1$ 130 to A-S$_0$ 120.

A-S$_0$ 122 sends a request 403 to S$_{00}$ 161 for the current VNF state. S$_{00}$ 161 sends 404 the current VNF state to A-S$_0$ 122. A-S$_0$ 122 performs A-S VNF processing 405 in light of the current VNF state and the data uploaded by the WD 140 and forwarded by AP$_1$ 130 and provides 406 information regarding such processing to S$_{00}$ 161.

As a result of the A-S VNF processing 405, A-S$_0$ 122 may download 407 control commands and/or data to AP$_1$ 130 that AP$_1$ 130 forwards 408 to the WD 140.

S$_{00}$ 161 may from time to time update 409 the VNF state in accordance with information provided to it from A-S$_0$ 122 (and/or PU$_0$ 123 (not shown)). In some example embodiments, such update may occur periodically. In some example embodiments, such update may occur when S$_{00}$ 161 determines that information has been provided to it.

The foregoing processing is repeated in subsequent message flow diagrams. For purposes of simplicity of illustration, dashed box 410 indicates that, when shown in such subsequent message flow diagrams, that message flows and actions 401-409 are performed at that point.

If, from time to time, A-S$_0$ 122 determines 411 that an intra-PoP domain handover has been triggered, A-S$_0$ 122 provides 412 a WD Mobility Event Trigger to SM/MM 350.

Upon receiving 412 this WD Mobility Event Trigger, the SM/MM 350 determines 413 suitable APs 130, 135 that may be candidates to whom the WD 140 may be handed over. For the sake of the example scenario depicted by FIG. 2, the identified candidate AP is AP$_2$ 135.

The SM/MM 350 communicates 414 an Allocate Resource request to AP$_2$ 135. AP$_2$ 135 sends an acknowledgment 415 to the SM/MM 350 that the request has been received.

The SM/MM 350 sends a Path Setup message 416 to the SDN-C 367. The SDN-C 367 sends 417 a message to A-S$_0$ 122 to configure the forwarding rules between A-$S_0$ 122 and $AP_2$ 135 and sends 418 a Configure Forwarding Rules message to $AP_2$ 135. The SDN-C 367 also sends 419 an ACK to the SM/MM 350 in response to the Path Setup message 416. Further, the SM/MM 350 sends 420 a Release Resources message to $AP_1$ 130.

At some point in time the WD 140 uploads data 421 to $AP_2$ 135. This data is forwarded 422 by $AP_2$ 135 to A-$S_0$ 122.

A-$S_0$ 122 sends a request 423 to $S_{00}$ 161 for the current VNF state. $S_{00}$ 122 sends 424 the current VNF state to A-$S_0$ 122. A-$S_0$ 122 performs A-S VNF processing 425 in light of the current VNF state and the data uploaded by the WD 140 and forwarded by $AP_2$ 135 and provides 426 information regarding such processing to $S_{00}$ 161.

As a result of the A-S VNF processing 425, A-$S_0$ 122 may download 427 control commands and/or data to $AP_2$ 135 that $AP_2$ 135 forwards 428 to the WD 140.

Additionally, from time to time $S_{00}$ 161 may update 429 the VNF state in accordance with information provided to it from A-$S_0$ 122 (and/or $PU_0$ 123 (not shown)).

Inter-PoP Domain Handover

By contrast to the scenario described in FIG. 4, in some example embodiments, the probabilistic estimate updates generated by the PU function 123 may determine that the WD 140 may have or be passing from a region 131 associated with a first AP 130 to a region associated with a second AP 430, whereupon the second AP 430 is associated with a downstream PoP 203 and its associated A-S VNF 422.

In such a scenarios, the handover involves the scaling of the state and of the A-S VNF. Such a handover is denoted as an inter-PoP domain handover.

Figure 5:
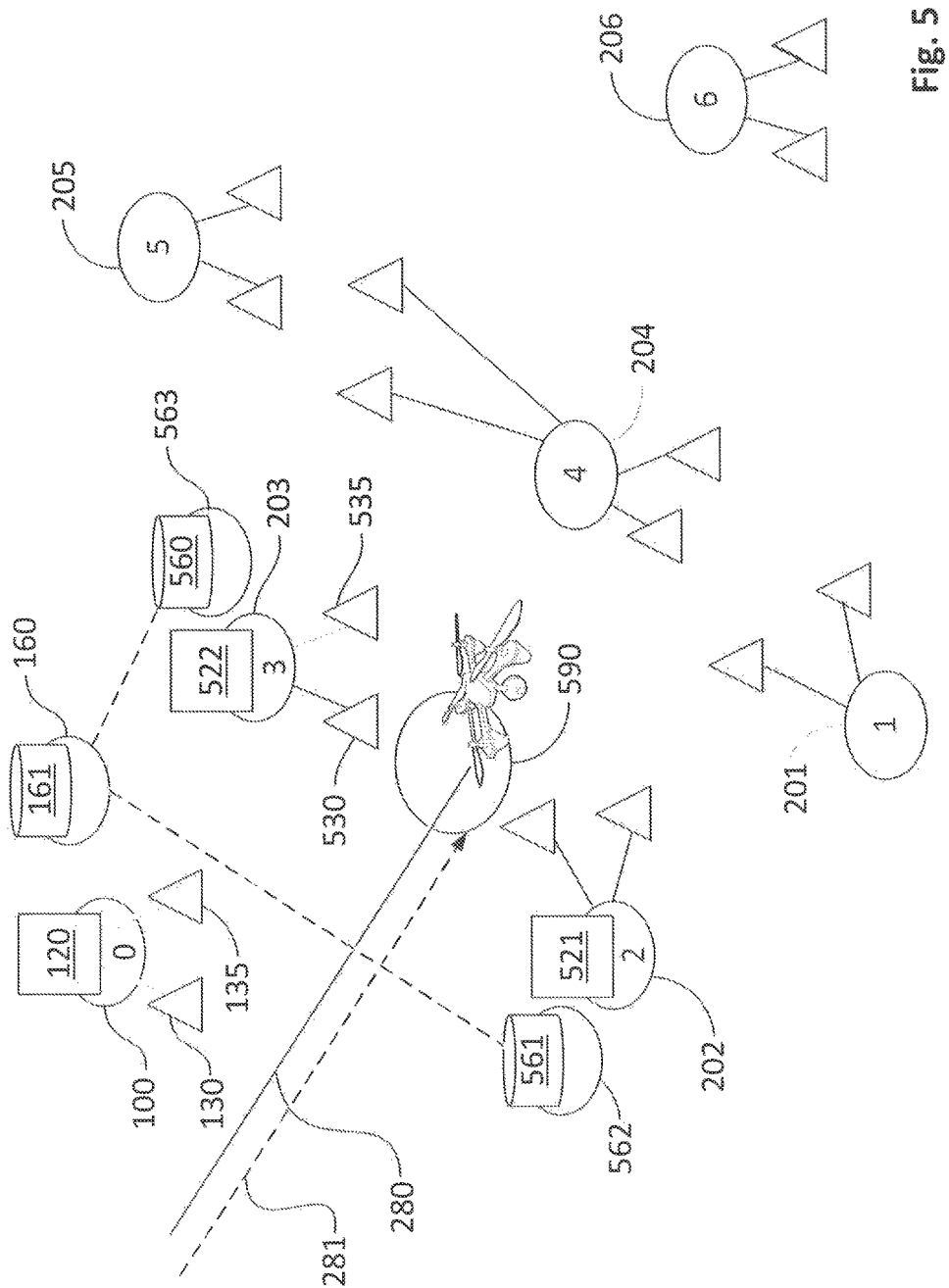
FIG. 5 is an example block diagram showing an example past trajectory and probabilistic estimates of the future trajectory path of the WD of FIG. 2 at a second subsequent point in time and the scaling out of VNF state databases or segments thereof and a serving A-S VNF to other PoPs in accordance with the probabilistic estimates.

As shown in FIG. 5, which shows the scenario shown in FIG. 2 but advanced further in time, before the WD 140 reaches any of the handover waypoints 292, 293, the MANO 360 proactively scales the state database or a segment 161 thereof from the PoP 160 (which, if no separate external VNF 160 is employed, may be the source $PoP_0$ 100 housing the A-SVNF 122) associated with the serving VNF 120. At the time that the state database or segment 161 is scaled out, no decision may yet have been made as between the destination PoP candidates $PoP_2$ 202, $PoP_3$ 203 and accordingly, the state database or segment 161 may be scaled out to a respective separate external VNF 560, 561 on a separate PoP 562, 563 associated with each destination PoP candidate, or in some example embodiments, to the respective destination PoP candidates $PoP_2$ 202, $PoP_3$ 203.

Around the same time that the MANO 360 proactively scales out by on-boarding, instantiating, configuring and activating, the state database or segment 560, 561, the MANO 360 establishes, that is, it on-boards instantiates and/or configures, but not does not activate the serving A-S VNF 521, 522 to a selected one or more of the destination PoP candidates $PoP_2$ 202, $PoP_3$ 203. The establishment is initiated, in sufficient time so that the A-S VNF (in this case 522) may be activated on or before the WD 140 is expected to reach the corresponding handover waypoint 590. In the scenario shown in FIG. 5, the A-S VNF 522 is activated and thus scaled to $PoP_3$ 203, since the MANO 360 has by that time determined that $PoP_3$ 203 (and not $PoP_3$ 202) is the appropriate PoP given the latest updates as to the trajectory path 281. Those having ordinary skill in this art will appreciate that the A-S VNF 522 may be established but is never activated on potential PoP candidate 202, and the storage and computational resources allocated to it may be released.

The proactive scaling of the state database or segment 560 before the activation or scaling of the A-S VNF 522 and before the WD 140 reaches the handover waypoint 590 allows the state database or segment 560 to be pre-configured and associated with the A-S VNF 522 by the time the A-S VNF 522 is later scaled so that both the state database or segment 560 and the A-S VNF 522 are fully active and ready to serve WD 140, allowing for a seamless handover when the WD 140 reaches the handover waypoint 590.

Figure 6:
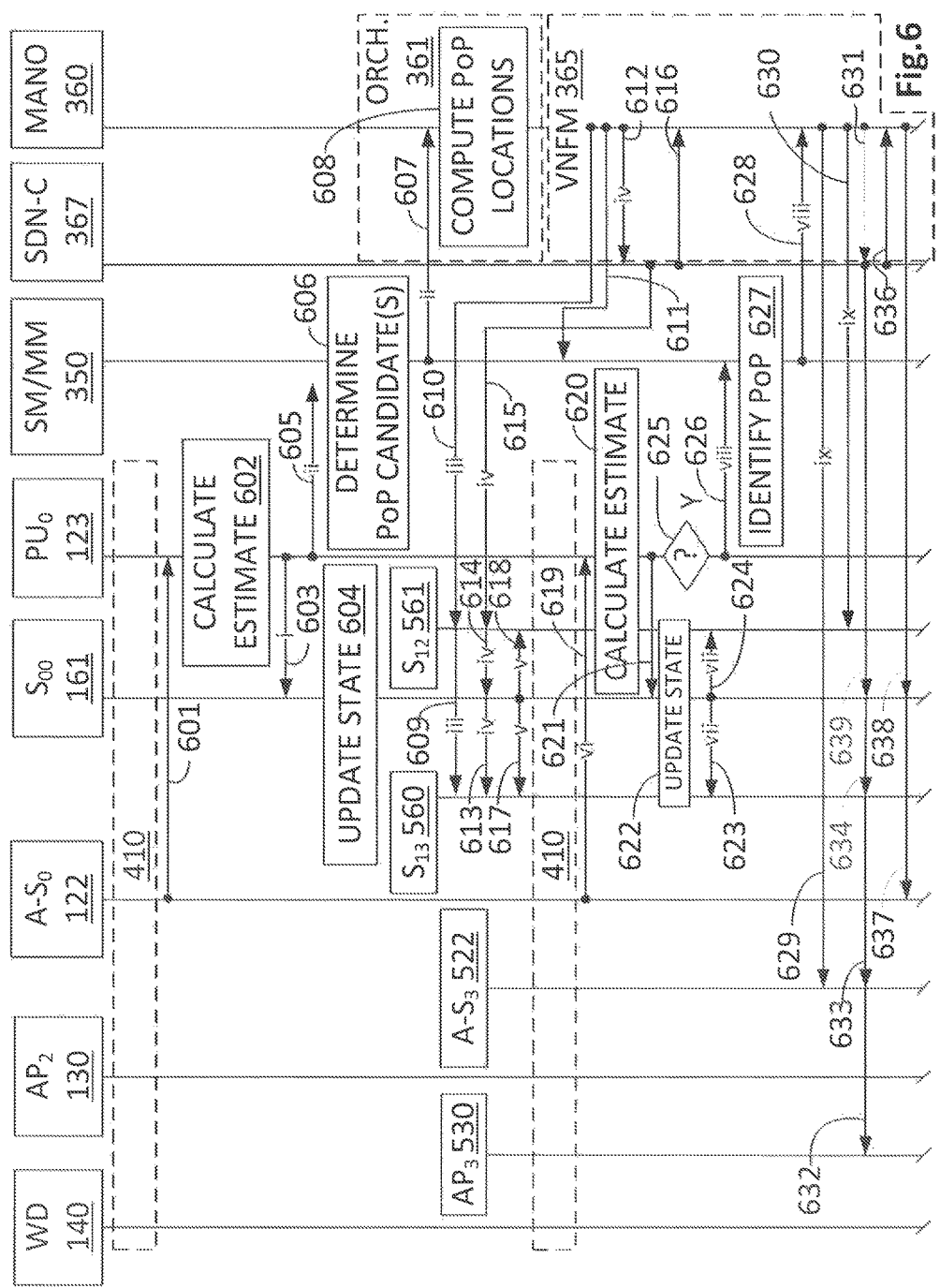
FIG. 6 is an example message flow diagram for the components of FIG. 3 in the context of the inter-PoP domain handover scenario shown in FIG. 5.

The scenario of proactively scaling the state database or segment 560 before scaling the A-S VNF 522 may be diagrammed by the example message flow diagram of FIG. 6.

Initially, WD 140 is served by VNF (designated $VNF_0$) 120 comprising A-S VNF (designated A-$S_0$) 122 and PU function (designated $PU_0$) 123 on $PoP_0$ 100 through $AP_2$ 135. $VNF_0$ 120 has associated therewith a state database (designated $S_{00}$) 161.

As exemplified by dashed box 410, when the WD 140 uploads 401 data to $AP_1$ 130, this data is forwarded 402 by $AP_1$ 130 to A-$S_0$ 120.

A-$S_0$ 122 sends a request 403 to $S_{00}$ 161 for the current VNF state. $S_{00}$ 161 sends 404 the current VNF state to A-$S_0$ 122. A-$S_0$ 122 performs A-S VNF processing 405 in light of the current VNF state and the data uploaded by the WD 140 and forwarded by $AP_1$ 130 and provides 406 information regarding such processing to $S_{00}$ 161.

As a result of the A-S VNF processing 405, A-$S_0$ 122 may download 407 control commands and/or data to $AP_1$ 130 that $AP_1$ 130 forwards 408 to the WD 140.

$S_{00}$ 161 may from time to time update 409 the VNF state in accordance with information provided to it from A-$S_0$ 122 (and/or $PU_0$ 123). In some example embodiments, such update may occur periodically. In some example embodiments, such update may occur when $S_{00}$ 161 determines that information has been provided to it.

Additionally, A-$S_0$ 122 forwards 601 the data uploaded 402 toot by the WD 140 to $PU_0$ 123. $PU_0$ 123 calculates 602 a probabilistic estimate of the trajectory path 282, 283 incorporating this uploaded data and provides 603 information regarding such calculation to $S_{00}$ 161.

$S_{00}$ 161 may from time to time update 604 the VNF state in accordance with the information provided to it from $PU_0$ 123 (and/or A-$S_0$ 122). In some example embodiments, such update may occur periodically. In some example embodiments, such update may occur when $S_{00}$ 161 determines that information has been provided to it.

After having calculated 602 a probabilistic estimate of the trajectory path 282, 283, $PU_0$ provides 605 this probabilistic estimate to the SM/MM 350.

The SM/MM 350 employs this probabilistic estimate to determine 606 suitable PoPs 202-205 that may be candidates to have the A-S VNF 122 scaled in order to serve the WD 140 once it leaves the geographic region served by $VNF_1$ 120 instantiated on $PoP_0$ 100. For the sake of the example scenario depicted by FIG. 5, the identified candidate destination PoPs are $PoP_2$ 202 and $PoP_3$ 203.

The SM/MM 350 provides a list of PoPs 201-206 and communicates 607 the identified destination PoP candidates 202, 203 to the MANO 360 with a request that a subset of the PoPs 201-206 be determined to host corresponding VNFs from the identified PoP candidates 202, 203. The Orchestrator 361 of the MANO 360 determines 608a subset of the PoPs 201-206 from the identified PoP candidates 202, 203 and passes these PoP locations onto the VNFM 365.

Once the locations of the identified PoPs 202, 203 have been determined, the VNFM 365 performs lifecycle management of the state database or segment thereof by scaling, that is, on-boarding, instantiating, configuring and activating 609, 610 a state database or a segment thereof. $S_{13}$560, $S_{12}$ 561, each associated with a VNF 120 each comprising an A-S VNF 122 and a PU function 123 on each of the respective identified PoP candidates $PoP_3$ 203, $PoP_2$ 202.

In some example embodiments, somewhat contemporaneously (not shown), the VNFM 365 establishes, that is, it on-boards, instantiates and configures, but does not activate, the VNF 120 each comprising an A-S VNF 122 and a PU function 123 on each of the identified PoP candidates, $PoP_3$ 203, $PoP_2$ 202, taking into account appropriate durations of each stage of lifecycle management and recognizing that (in the case of PoP candidate $PoP_3$ 203) the time to establish the VNF 520 comprising A-S VNF 522 and PU 523 may be considerably longer than to scale the corresponding actions for the state database or segment 560 associated therewith.

In some example embodiments, as shown in FIG. 5, the state database or segment $S_{13}$ 560, $S_{12}$ 561 may be scaled on respective external PoPs 562, 563. It should be noted that while the external VNFs 562, 663, on which respective state databases or segments $S_{13}$ 560, $S_{12}$ 561 having been on-boarded, instantiated, configured and activated are considered to have been scaled out, the VNFs 520, 521 on the identified PoP candidates $PoP_3$ 203, $PoP_2$ 202 with which they are associated therewith have only been established and have not been activated at this point. Accordingly, they are not considered to have yet been scaled out.

Further, in some example embodiments, one or more of the state databases or segments $S_{13}$ 560, $S_{12}$ 561 may in some example embodiments be an internal VNFC (or for that matter, an external VNF) on the PoP candidates $PoP_3$ 203, $PoP_2$ 202. In such example embodiments, the state database or segment $S_{13}$ 560, $S_{-12}$ 561 may have been on-boarded, instantiated and configured on the PoP candidates $PoP_3$ 203, $PoP_2$ 202 with the A-S VNF 122 and the PU function 123 but only the state database or segment $S_{13}$ 560, $S_{12}$ 561 will have been activated.

Additionally, the VNFM 365 sends an Acknowledgement 611 to the SM/MM 350 that the PoP candidate locations have been determined and that the state databases or segments $S_{13}$ 560, $S_{12}$ 561, have been on-boarded, instantiated, configured and activated on the respective PoP candidates $PoP_3$ 203, $PoP_2$ 202 (or in respective external VNFs on PoPs 563,562). Further, the VNFM 365 sends a Path Configuration message 612 to the SDN-C 367.

The SDN-C 365 configures and communicates forwarding rules 613-615 to the state databases $S_{00}$ 161, as well as the state databases or segments $S_{13}$ 560, $S_{12}$ 561. The forwarding rules tell the intermediate routers (not shown) between $S_{00}$ and $S_{12}$ 561, $S_{13}$ 562 where to send each packet of each flow of packets on a hop by hop basis, permitting these functions to communicate with each other.

The SDN-C 367 sends an acknowledgement 616 to the VNFM 365 after successfully configuring the forwarding rules between the PoPs hosting the state VNFs.

The serving state database $S_{00}$ 161 exports 617, 618 the current VNF state or a segment thereof to the newly instantiated state databases or segments $S_{13}$ 560, $S_{12}$ 561.

At some point in time thereafter, the processing repeats, initiated by a fresh data upload from the WD 140.

As exemplified by dashed box 410, when the WD 140 uploads 401 data to $AP_1$ 130, this data is forwarded 402 by $AP_1$ 130 to A-$S_0$ 120.

A-$S_0$ 122 sends a request 403 to $S_{00}$ 161 for the current VNF state. $S_{00}$ 161 sends 404 the current VNF state to A-$S_0$ 122. A-$S_0$ 122 performs A-S VNF processing 405 in light of the current VNF state and the data uploaded by the WD 140 and forwarded by $AP_1$ 130 and provides 406 information regarding such processing to $S_{00}$ 161.

As a result of the A-S VNF processing 405, A-$S_0$ 122 may download 407 control commands and/or data to $AP_1$ 130 that $AP_1$ 130 forwards 408 to the WD 140.

$S_{00}$ 161 may from time to time update 409 the VNF state in accordance with information provided to it from A-$S_0$ 122 (and/or $PU_0$ 123). In some example embodiments, such update may occur periodically. In some example embodiments, such update may occur when $S_{00}$ 161 determines that information has been provided to it.

Additionally, A-$S_0$ 122 forwards 619 the data uploaded 402 to it by the WD 140 to $PU_0$ 123. $PU_0$ 123 calculates 620 a probabilistic estimate of the trajectory path 282, 283 incorporating this uploaded data and provides 621 information regarding such calculation to $S_{00}$ 161.

$S_{00}$ 161 may from time to time update 622 the VNF state in accordance with the information provided to it from $PU_0$ 123 (and/or A-$S_0$ 122). In some example embodiments, such update may occur periodically. In some example embodiments, such update may occur when $S_{00}$ 161 determines that information has been provided to it. $S_{00}$ 161 having updated 622 the VNF state, it exports 623, 624 the current VNF state or a segment thereof to the potential destination state databases or segments $S_{13}$ 560, $S_{12}$ 561.

After having calculated 620 a probabilistic estimate of the trajectory path 282, 283, if the probabilistic estimate attributes have been updated 625, $PU_0$ provides 626 this probabilistic estimate to the SM/MM 350.

The SM/MM 350 may narrow the candidate set of PoPs given the existence of updated probability estimates. Assuming this is the case, by way of non-limiting illustration, the SM/MM 350 selects 627 one of the previously identified PoP candidates $PoP_2$ 202, $PoP_3$ 203 and identifies it 628 to the VNFM 365. For the sake of the example scenario depicted by FIG. 5, the selected candidate PoP is $PoP_3$ 203. Those having ordinary skill in this art will appreciate that it is possible that the updated probabilistic estimate might lead the SM/MM 350 to identify a new, not previously identified PoP candidate (not shown). In such a case, it is possible that such candidate would be communicated to the VNFM 365 as the selected candidate PoP or to the Orchestrator 361 as another suitable candidate. In such an example scenario, care should be taken to ensure that there remains sufficient opportunity to perform lifecycle management and state scaling for such additional candidate, before identifying it as a candidate.

The VNFM 365 activates 629 the VNF (designated $VNF_3$ 520) comprising A-S VNF (designated A-$S_3$) 522 and PU function (designated $PU_3$) 523 on $PoP_3$ 203.

Having selected $PoP_3$ 203 as the PoP on which the A-S VNF 522 is to be scaled, the state database or segment $S_{23}$ 560 is already scaled and has sufficient information to determine the current VNF state. The VNFM 365 therefore deactivates 630 the state database or segment $S_{12}$ 561 which is no longer appropriate. VNF 521 has never been activated so the VNFM 365 does not deactivate it.

The VNFM 365 sends a Path Configuration message 631 to the SDN-C 367.

The SDN-C 365 configures and communicates forwarding rules 632-635 to the AP associated with A-$S_3$ 522 (designated $AP_3$ 530), A-$S_3$ VNF 522, $S_{13}$ 560 and state database $S_{00}$ 161. The forwarding rules tell the intermediate routers (not shown) between these entities where to send each packet of each flow of packets on a hop by hop basis, permitting these functions to communicate with each other.

The SDN-C 367 sends an acknowledgement 636 to the VNFM 365 after successfully configuring the forwarding rules 632-635.

At some point thereafter, for completeness, the VNFM 365 may deactivate A-S$_0$ 122 (and PU$_0$ 123) and its associated state database S$_{00}$ 161.

Once AP$_3$ 530 communicates with the WD 140, handover will be complete. Thereafter (not shown), when the WD 140 uploads data, it will be to AP$_3$ 530, and will be forwarded by AP$_3$ 530 to A-S$_3$522, A-S$_3$ 522 will send its request to S$_{13}$ 561 for the current VNF state and will forward the data uploaded to it by the WD 140 to PU$_3$ 523 to calculate a probabilistic estimate of the trajectory path 282, 283 incorporating this uploaded data.

Fragmentation of State Context

Figure 7:
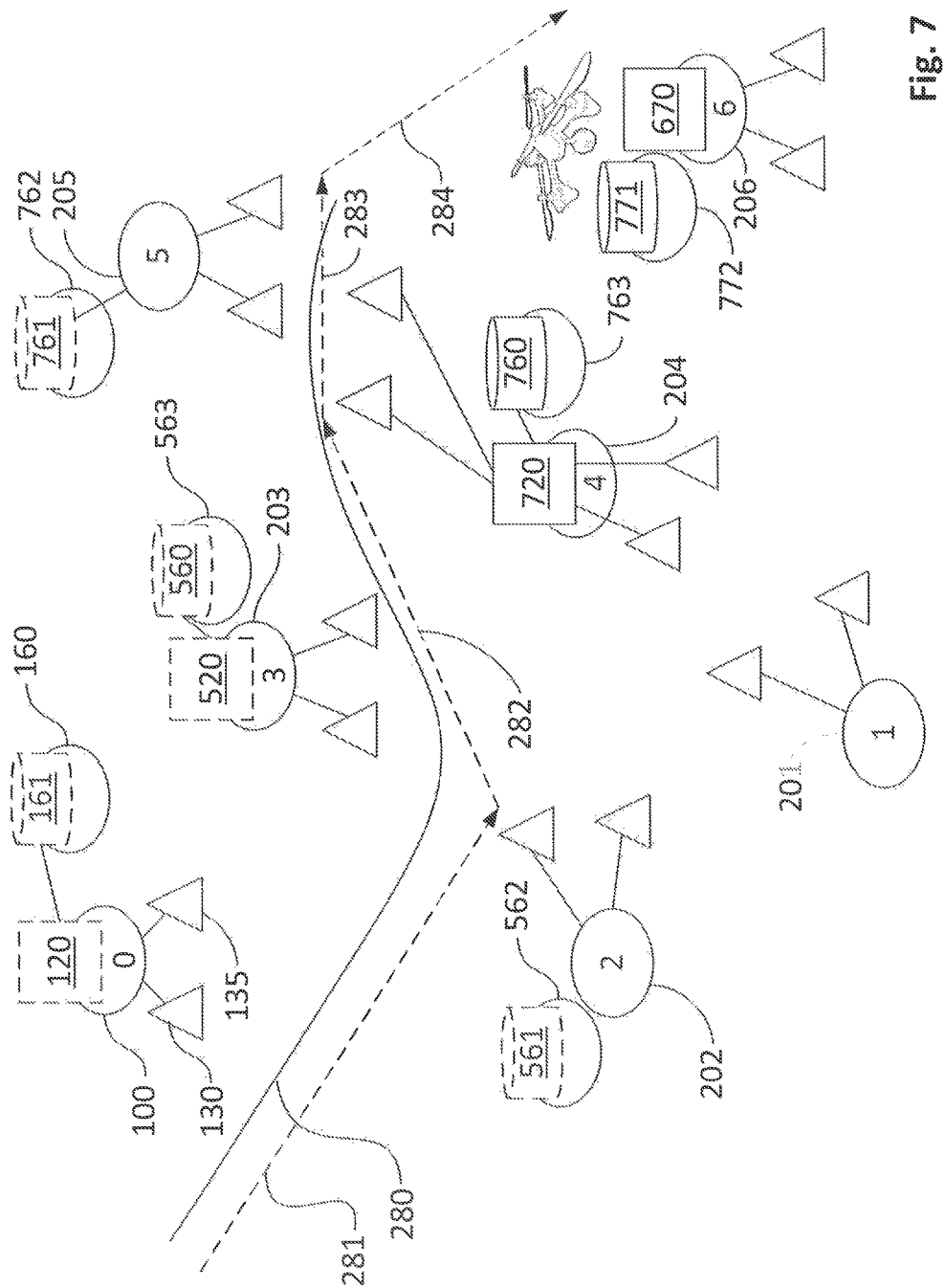
FIG. 7 is an example block diagram showing an example past trajectory of the WD of FIGS. 2 and 5 at a third subsequent point in time and the scaling out of VNF state databases or segments thereof and a serving A-S VNF to other PoPs in accordance with probabilistic estimates of the trajectory path of the WD.

Turning now to FIG. 7, there is shown the scenario shown in FIGS. 2 and 5 but advanced still further in time. In this scenario, the serving VNF has progressed from VNF 120 on PoP$_0$ 100 to VNF 520 on PoP$_3$ 203 and now to VNF 720 on PoP$_4$ 204 (after having provisionally scaled state databases or segments 760, 761 as external VNFs on respective associated PoPs 763, 762). VNFs 120, 520 and state databases or segments 161 and 560 corresponding respectively thereto have now been deactivated (shown in dashed outline).

Additionally, in the example procedure described by FIG. 6, provisional state databases or segments 561, 761 corresponding respectively to PoP candidates 202, 205 were on-boarded, instantiated, configured and activated but thereafter deactivated when the PU function 123 selected PoP candidates 203, 204 on which to scale the VNFs 420, 620.

Still further, the PU function 123 has just identified and selected a further downstream PoP candidate 206 on which to potentially scale a further VNF 770, after having scaled a state database or segment 771 as an external VNF on an associated PoP 772.

Figure 8:
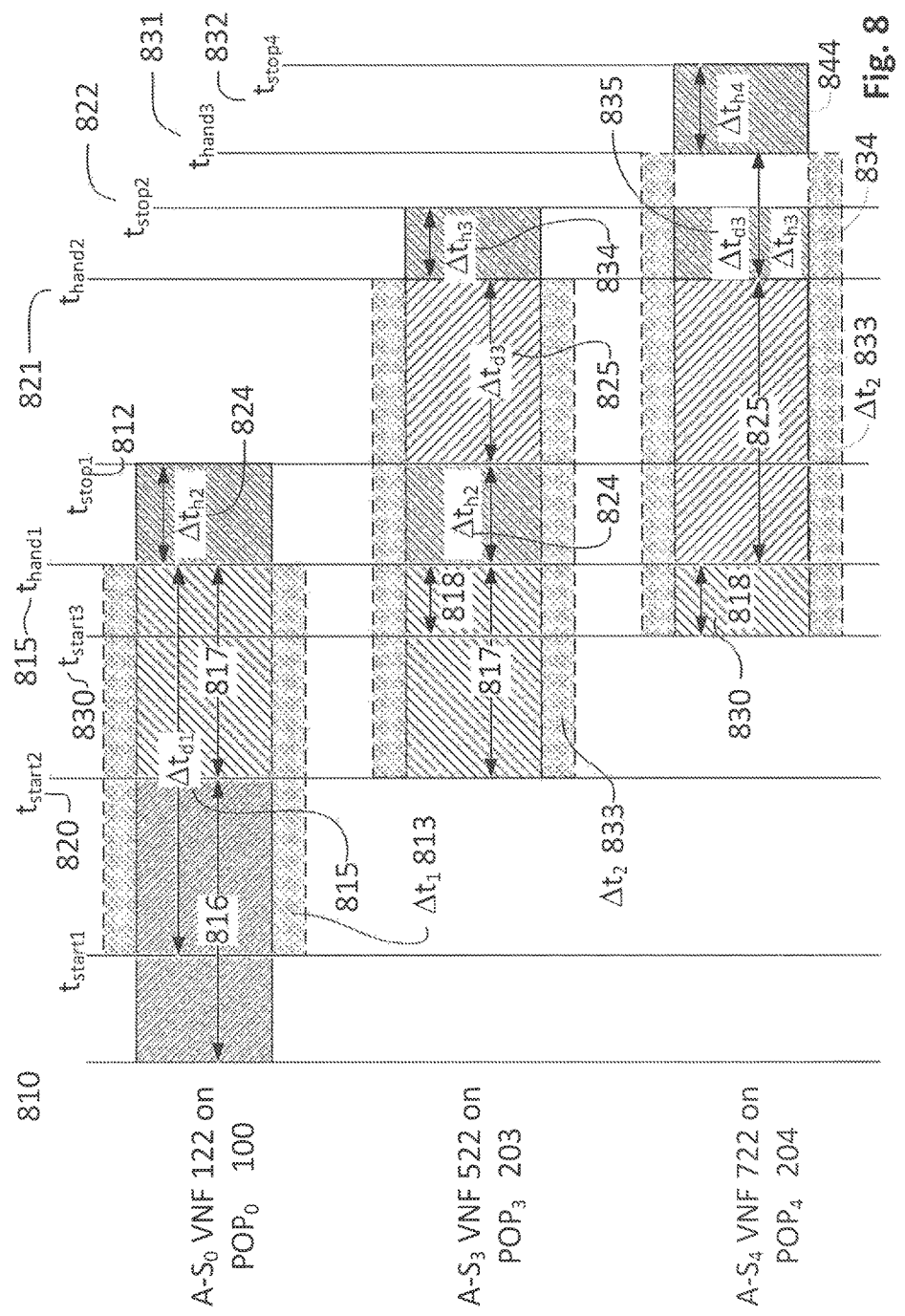
FIG. 8 is an example timing diagram showing an example of fragmentation of state content for export to a VNF state database or segment thereof in the context of the scenario shown in FIG. 7.

FIG. 8 shows a timing diagram that illustrates in a non-limiting example, how context-related data is maintained in the state databases or segments thereof as the serving VNFs 120, 520, 720 are scaled out. The diagram shows state content for the three serving VNFs 120, 520, 720 on respective PoPs PoP$_0$ 100, PoP$_3$ 203, PoP$_4$ 204. The state content is decomposed into fragments, some or all of which are exported to downstream state databases or segments thereof.

The diagram shows the respective start times $t_{start1}$810, $t_{start2}$820, $t_{start3}$830 at which time, after activation, when the state database or segment thereof corresponding to respective A-S VNFs 122, 522, 722 is ready to serve the corresponding A-S VNF 161, 522, 722, as well as respective handover times $t_{hand1}$811, $t_{hand2}$821, $t_{hand3}$831, at which time the association of the WD 140 to the A-S VNF 122, 522, 722 is changed, such as, in some example embodiments, by handover, from one (upstream) A-S VNF 122, 522, 722 to the next (downstream) VNF 522, 722 is commenced, and respective stop times $t_{stop1}$812, $t_{stop2}$822, $t_{stop3}$832, at which time the change of association of the WD 140 from the source A-S VNF 122, 522, 722 to the destination A-S VNF 122, 522, 722 is completed.

The region before start time $t_{start1}$ 810 represents context-related information stored in the state database 161 that is of no significance to the decision-making process in the A-S VNF 122.

The period between a start time $t_{starti}$ and a handover time $t_{handi}$ defines a state lifetime window $\Delta t_l$, which specifies a minimum of context-related data that should be maintained for acceptable VNF operation. Thus, respective state lifetime windows $\Delta t_1$813, $\Delta t_2$823 and $\Delta t_3$833 are shown for each of the A-S VNFs 122, 522, 722.

The context-related data that is maintained will depend upon the particular A-S VNF 122 and AF 170 associated therewith. In the mission-critical MEC use case described above by way of non-limiting example, the context-related data may comprise context information of the WD 140 (by way of non-limiting example, device telemetry and/or target attributes).

Similarly, the period between a handover time $t_{handi}$ and a stop time $t_{stopi}$ defines a handover period $\Delta t_{hi}$ during which state content may be generated and maintained by the state database or segment thereof corresponding to either or both of the source A-S VNF 122, 522, 722 or the destination A-S VNF 522, 722, 772.

Thus, for each A-S VNF 122, 522, 722, the period between the handover time $\Delta t_i$ when handover is initiated from the previous upstream A-S VNF 122, 522, 722 to such A-S VNF 122, 522, 722 and the subsequent handover time $\Delta t_{i+1}$ when handover is initiated to the subsequent downstream A-S VNF 122, 522, 722 defines a data generation period $\Delta t_{di}$ during which context-related data is generated and maintained by the state database or segment thereof corresponding to the A-S VNF 122, 522, 722.

Thus, the state lifetime window $\Delta t_1$813 for serving A-S VNF 122 maintained by state database 161 comprises data generation period $\Delta t_{d1}$815 and optionally handover period $\Delta t_{h2}$824.

In some example embodiments, as discussed above, the entire state lifetime window $\Delta t_i$ of state database 161, 560, 760 for a source A-S VNF may be exported to the state database 161, 560, 760 for the downstream A-S VNF 122, 522, 762. However, as shown by FIG. 8, this results in the export of more information than can be used by the downstream A-S VNF 122, 522, 722. For example, the state context of serving A-S VNF 122 corresponding to the portion 816 of data generation period $\Delta t_{d1}$815 that lies before $t_{start2}$820 is not relevant to the state of A-S VNF 522. Thus, the state context may be decomposed into portions 815, 816. This portion 816 may be discarded and not exported to the state database segment 560. On the other hand, the remaining portion 817 may comprise a segment of the state database 161 that may be exported by state database 161 to state database segment 560, whereupon it forms part of the state lifetime window $\Delta t_2$823 for downstream A-S VNF 522.

Thus, the state lifetime window $\Delta t_2$823 for A-S VNF 522 maintained by state database segment 560 comprises portion 817 exported by state database 161, together with data generation period $\Delta t_{d2}$825 and optionally handover period $\Delta t_{h3}$ 834.

By the same token, all of data generation period $\Delta t_{d2}$825 and a fragment 818 of portion 817 exported to state database segment 560 by state database 161 is exported by state database segment 161 to state database segment 760, whereupon it forms part of the state lifetime window $\Delta t_3$833 for A-S VNF 722.

Thus, the state lifetime window $\Delta t_3$833 for VNF 722 maintained by state database segment 860 comprises portion 818 and data generation period $\Delta t_{d2}$825 exported by state database segment 560, together with data generation period $\Delta t_{d3}$835 and optionally handover period $\Delta t_{h4}$844.

That is, the state $S(D, t_s, t_s+\Delta t_i)$ of the A-S VNF 122, 522, 722 may be seen to comprise multiple fragments generated by one or more of the upstream state databases or segments 161, 560, 760, that collectively correspond to the state context that is generated during handover $(\Delta t_{hi})$ and when the WD 140 is served by the downstream A-S VNF 122, 522, 722 $(\Delta t_{di})$.

Such fragmentation of the state minimizes the data load incurred in exporting the operative portions of the VNF state to state database segments 560, 760 for later A-S VNFs 522, 722, which facilitates enabling seamless control of the WD 140 as such later A-S VNFs 522, 722 are activated.

The state content fragments that are exported from a source PoP to a destination PoP set P may be given by:

$$\max\left(0, S(D, t_s, t_s + \Delta t_l) - \sum_{p \forall P} S(D, t_s t_s + \Delta t_h^p + \Delta t_d^p)\right) \quad (1)$$

Equation (1) indicates the quantity of state content that is exported from one PoP to a downstream PoP. This state content is expressed as a max function since no state content is exported if the difference between the state in a given PoP and the sum of all states imported from upstream PoPs is less than 0.

Figure 9:
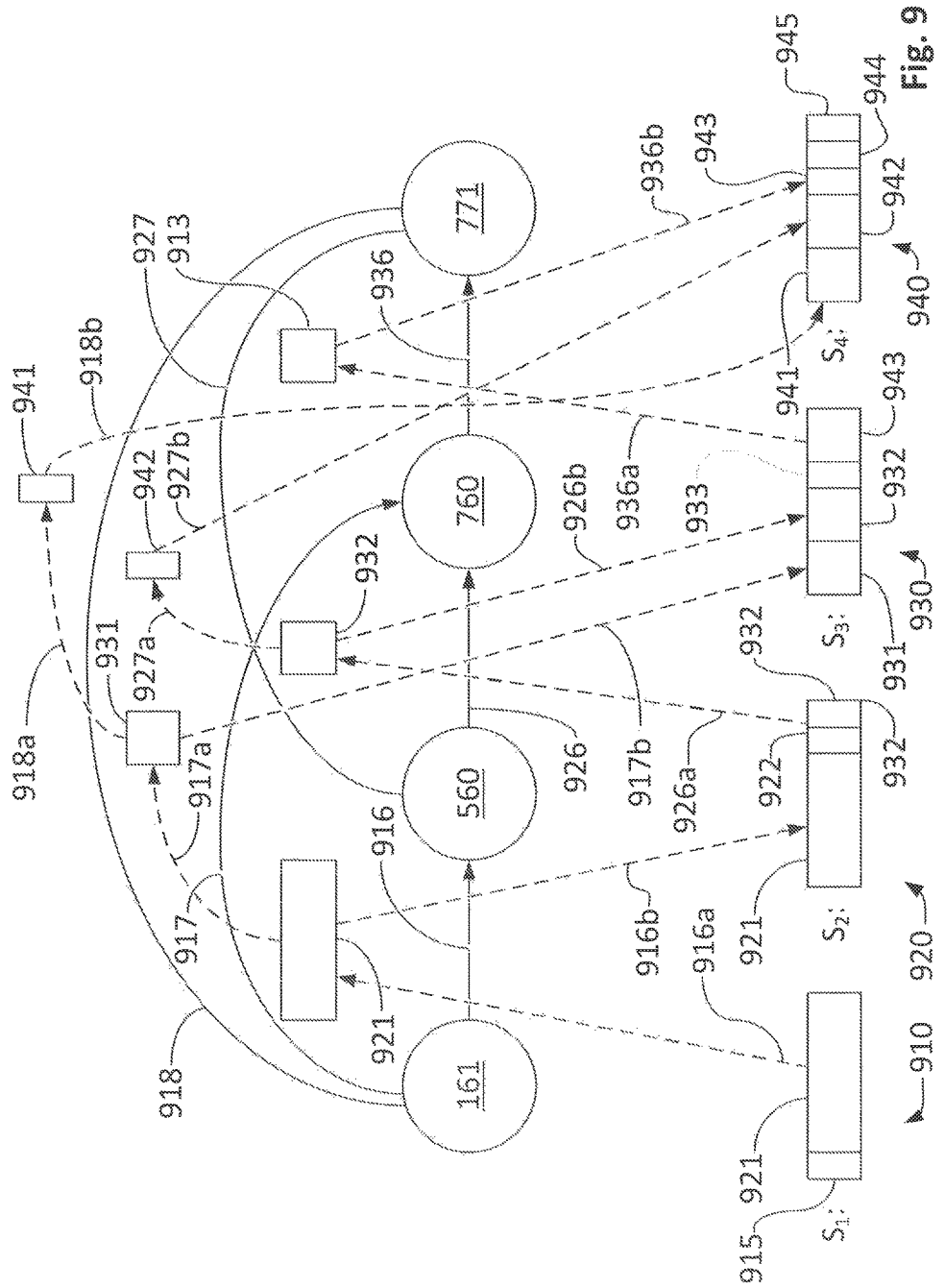
FIG. 9 is an example data flow diagram showing example data flows between the source and destination state databases or segments thereof in the context of the scenario shown in FIG. 7.

Turning now to FIG. 9, there is shown an example data flow diagram that shows example data flows from one or more source state databases or segments 161, 560, 560 to one or more destination state databases or segments 560, 760, 771. Those having ordinary skill in this art will appreciate that in the scenario described in FIG. 7, there were also provisional state database segments 5561 and 761 to which there may have been example data flows and from which there may have been example data flows before the PoP candidate 202 was not ultimately selected and the state database segments 561, 761 deactivated. For purposes of simplicity of illustration, such example data flows have been omitted.

Associated with the A-S VNF 122, 522, 722, 772 respectively corresponding to each state database segment 161, 560, 760, 771, is a state $S_i$910, 920, 930, 940. Each state $S_i$910, 920, 930, 940 is comprised of one or more fragments 911, 921, 922, 931, 932, 941, 942, 943, 944, 945 that may have been generated by the state database or segment 161, 560, 760, 770 in accordance with FIG. 8, or transferred by a data flow from an upstream state database or segment 161, 560, 760, as shown in FIG. 8.

By way of non-limiting example, state $S_1$910 corresponding to A-S VNF 122 comprises fragments 911, 921. Fragment 911 is generated by state database or segment 161 and corresponds to portion 816, which is not relevant to any of downstream states $S_2$920, $S_3$930, $S_4$940 and is not exported downstream. Fragment 921 is generated by state database or segment 161 and corresponds to portion 817, and is exported to state database or segment 560 along data flow 916 and shown conceptually by dashed lines 916a, 916b.

Further, state $S_2$920 corresponding to A-S VNF 522 comprises fragments 921, 922, 932. Fragment 921 is generated by state database or segment 161 and is exported by it along data flow 916. Fragment 922 is generated by state database or segment 560 and corresponds to handover period $\Delta t_{h2}$824. Fragment 932 corresponds to the remaining portion of data generation period $\Delta t_{d2}$825, and is generated by state database or segment 560 and exported by it to state database or segment 760 along data flow 926 and shown conceptually by dashed lines 926a, 926b.

Still further, state $S_3$930 corresponding to VNF 720 comprises fragments 931, 932, 933 943. Fragment 931 is generated by state database or segment 161 and is a subset of fragment 921 corresponding to portion 818, which is exported by state database or segment 161 to state database or segment 760 along data flow 917 and shown conceptually by dashed lines 917a, 917b, 916a. Fragment 932 is generated by state database or segment 560 and is exported by state database or segment 560 along data flow 926. Fragment 933 is generated by state database or segment 760 and corresponds to handover period $\Delta t_{h3}$834. Fragment 943 corresponds to the remaining portion of data generation period $\Delta t_{d3}$835 and is generated by state database or segment 760 and exported by it to state database segment 771 along data flow 936 and shown conceptually by dashed lines 936a, 936b.

Finally, state $S_4$ 940 corresponding to VNF 770 comprises fragments 941, 942, 943, 944, 945. Fragment 941 is generated by state database or segment 161 and is a subset of fragment 931, which in turn is a subset of fragment 921 corresponding to portion 818, which is exported by state database or segment 161 to state database or segment 771 along data flow 918 and shown conceptually by dashed lines 918a, 918b, 917a, 916a. Fragment 942 is a subset of fragment 932 that corresponds to the remaining portion of data generation period $\Delta t_{d2}$825 and is generated by state database or segment 560 and exported by it to state database or segment 770 by data flow 927 and shown conceptually by dashed lines 927a, 927b. Fragment 943 is generated by state database or segment 760 and is exported by it along data flow 936. Fragment 944 is generated by state database or segment 771 and corresponds to handover period $\Delta t_{h4}$844. Fragment 945 is generated by state database or segment 771.

These fragments 911, 921, 922, 931, 932, 941, 942, 943, 944, 945 are scheduled taking into consideration available probabilistic estimates of the trajectory paths 282, 283, 284 indicative of the mobility of the WD140, such that each fragment is received in time for assembly by the downstream state database or segment 540, 760, 771 before the WD140 arrives in the geographic region covered by each downstream A-S VNF 522, 722, 772.

Figure 10:
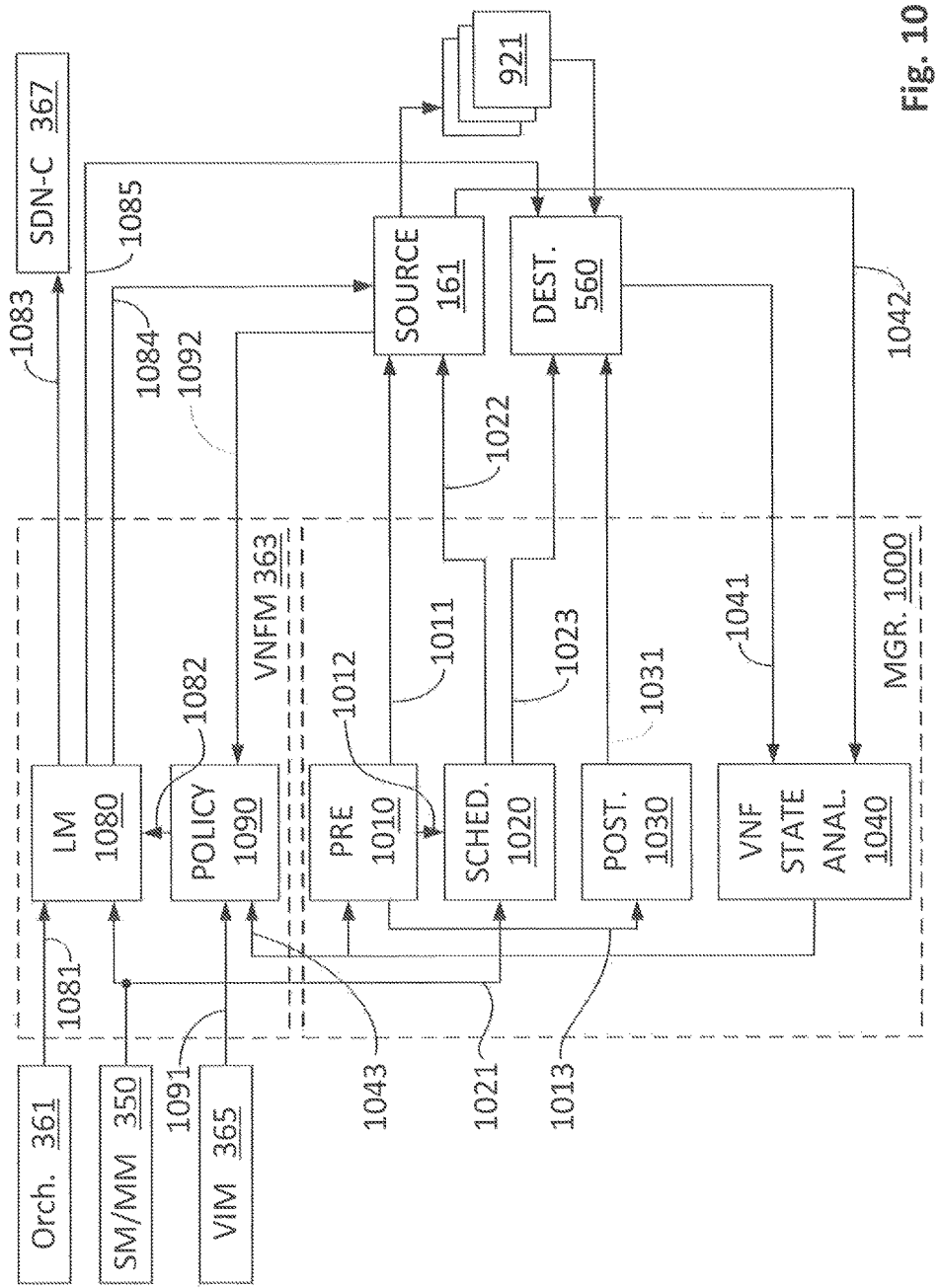
FIG. 10 is an example block diagram showing an example VNF state scaling manager in the context of the components of FIG. 3.

Turning now to FIG. 10, there is shown a block diagram showing example components of a VNF state scaling manager 1000 for supporting VNF state scaling and discussed herein, as they interact to fragment and re-assemble state fragments (for purposes of simplicity of illustration, only fragment 921 from state database or segment 161 to state database or segment 560 is shown).

The state scaling manager 1000 provides enhanced capabilities to the VNFM 363 for supporting stateful A-S VNFs 122 by providing a flexible method for scaling the VNF state 161 over a wide area network (WAN) (not shown).

The state scaling manager 1000 accepts inputs 1021 from the SM/MM 350 and 1041, 1042 respectively from one or more destination state databases or segments thereof (for purposes of simplicity of illustration, only state database or segment 450 is shown) and from one or more source state databases or segments thereof (for purposes of simplicity of illustration, only state database or segment 161 is shown). The state scaling manager 1000 generates outputs 1043 to the VNFM 363, outputs 1011, 1022 to the source state database(s) or segment(s) thereof and outputs 1023, 1031 to the destination state database(s) or segment(s) thereof. The VNFM 363 provides VNF lifecycle management, that is, on-boarding, instantiation, configuration, activation and/or deactivation of VNFs, while the state scaling manager 1000 provides VNF state pre- and post-processing and scheduling.

In some example embodiments, the state scaling manager 1000 may comprise part of or may have its components integrated within the VNFM 363. In some example embodiments, the state scaling manager 1000 may comprise a pre-processor 1010, a scheduler 1020, a post-processor 1030 and a VNF state analyzer 1040.

The pre-processor 1010 accepts inputs 1043 from the VNF state analyzer 1040 and generates outputs 1011 to each of the source state database(s) or segment(s) 161, outputs 1012 to the scheduler 1020 and outputs 1013 to the post-processor 1030. While only one source state database or segment 161 is shown, those having ordinary skill in this art will appreciate, especially from consideration of FIG. 9, that each state database or segment 161, 560, 760, 770 may serve as a source state database or segment 161 and that the pre-processor 1010 generates outputs 1011 to potentially each state database or segment 161, 560, 660, 670, even if not shown in the Figure.

The pre-processor 1010 determines the fragments of the state, as indicated in FIGS. 8 and 9, that are to be scaled from the source PoP to downstream PoPs, from which a state fragmentation decision is computed and fragments the state based on such state fragmentation decision.

The scheduler 1020 accepts inputs 1021 from the SM/MM 350, 1012 from the pre-processor 1010 and generates outputs 1022, 1023 to each of the source state database(s) or segment(s) 161 and destination state database(s) or segment(s) 560 respectively. While only one source state database or segment 161 and only one destination state database or segment 560 is shown, those having ordinary skill in this art will appreciate, especially from consideration of FIG. 9, that each state database or segment 161, 560, 760, 770 may serve in respect of some state fragments 921 as a source state database or segment 161 and in respect of other state fragments 921 as a destination state database or segment 560. However, in respect of any given state fragment 921, a given state database or segment 161, 560, 760, 770 will not serve as both a source 161 and a destination 560 state database or segment. Those having ordinary skill in this art will also appreciate that the scheduler 1020 generates outputs 1021 to potentially each state database or segment 161, 560, 760, 770 as a source state database or segment 161 and 1022 to potentially each state database or segment 161, 560, 760, 770 as a destination state database or segment 560 subject to such constraints, even if each state database or segment 161, 560, 760, 770 is not shown in the Figure.

The scheduler 1020 uses timing information from the SM/MM 350 concerning the trajectory of the WD 140 and arrival of the WD 140 at the PoPs along with the size of each state fragment from the pre-processor 1010 to determine a state fragment export schedule and generates scheduling grants to the source and destination PoPs for exporting and importing the state fragments in accordance with such schedule.

The post-processor 1030 accepts inputs 1013 from the pre-processor 1010 and generates outputs 1031 to each of the destination state databases or segments 560. While only one destination state database or segment 560 is shown, those having ordinary skill in this art will appreciate, especially from consideration of FIG. 9, that each state database or segment 161, 560, 760, 770 may serve as a destination state database or segment 560 and that the post-processor 1030 generates outputs 1031 to potentially each state database or segment 161, 560, 760, 770, even if not shown in the Figure.

The post-processor 1030 determines the format of the state fragment assembly at each destination PoP based on the state fragmentation decision received from the pre-processor 1010 and assembles the received state fragments in such state assembly format. In some example embodiments, the pre-processor 1010 and the post-processor 1030 may be implemented as two different component functions respectively residing in the upstream and downstream PoPs 100, 201-205, with an external interconnecting interface (not shown) for effecting communications therebetween.

The VNF state analyzer 1040 accepts inputs 1041, 1042 from respectively each of the source 161 and destination 560 state databases or segments and generates outputs 1043 to the pre-processor 110 and to a policy enforcement component 1090 of the VNFM 363. While only one source state database or segment 161 and only one destination state database or segment 560 is shown, those having ordinary skill in this art will appreciate, especially from consideration of FIG. 9, that each state database or segment 161, 560, 760, 770 may serve in respect of some state fragments 921 as a source state database or segment 161 and in respect of other state fragments 921 as a destination state database or segment 560. However, in respect of any given state fragment 921, a given state database or segment 161, 560, 760, 770 will not serve as both a source 161 and a destination 560 state database or segment. Those having ordinary skill in this art will also appreciate that the VNF state analyzer 1040 accepts inputs 1042 from potentially each state database or segment 161, 560, 760, 770 as a source state database or segment 161 and inputs 1041 from potentially each state database or segment 161, 560, 760, 770 as a destination state database or segment 560 subject to such constraints, even if each state database or segment 161, 560, 760, 770 is not shown in the Figure. The VNF state analyzer 1040 determines the state content available at each source and destination PoP and generates state status reports that it provides to the policy enforcement component of the VNFM 363 and the pre-processor 1010.

In some example embodiments, the VNFM 363 comprises a lifecycle manager 1080 and the policy enforcement component 1090. Those having ordinary skill in this art will appreciate that the VNFM 363 may comprise additional components that are not discussed herein for purposes of simplicity only.

The lifecycle manager 1080 accepts inputs 1081 from the orchestrator 361, inputs 1021 from the SM/MM 350 and inputs 1082 from the policy enforcement component 1090. The lifecycle manager 1080 generates outputs 1083 to the SDN-C 367, outputs 1084 to each of the source state databases or segments 161 and outputs 1085 to each of the destination state databases or segments 560. While only one source state database or segment 161 and only one destination state database or segment 560 is shown, those having ordinary skill in this art will appreciate, especially from consideration of FIG. 9, that each state database or segment 161, 560, 760, 770 may serve in respect of some state fragments 921 as a source state database or segment 161 and in respect of other state fragments 921 as a destination state database or segment 560. However, in respect of any given state fragment 921, a given state database or segment 161, 560, 760, 770 will not serve as both a source 161 and a destination 560 state database or segment. Those having ordinary skill in this art will also appreciate that the lifecycle manager 1080 generates outputs 1084 to potentially each state database or segment 161, 560, 760, 770 as a source state database or segment 161 and 1085 to potentially each state database or segment 161, 560, 760, 770 as a destination state database or segment 560 subject to such constraints, even if each state database or segment 161, 560, 760, 770 is not shown in the Figure.

The lifecycle manager 1080 determines the VNF lifecycle state (i.e. on-boarded, instantiated, configured, activated, de-activated and/or terminated) of each VNF under its control domain and enforces such decision at the source and destination PoPs. Additionally, the lifecycle manager 1080 notifies the SDN-C 367 to setup the forwarding rules on the network nodes between the source and destination PoPs.

The policy enforcement component 1090 accepts inputs 1043 from the VNF state analyzer 1040, inputs 1091 from the VIM 365 and inputs 1092 from one or more source state database(s) or segment(s) 161 and generates outputs 1082 to the lifecycle manager 1080.

The policy enforcement component 1090 manages the VNF lifecycle state policy database and notifies the VNF lifecycle manager 1080 as to VNF lifecycle state decisions given the VNF status obtained from the VNF state analyzer 1040 and resource availability at the PoPs obtained from the VIM 365.

In operation, the VNF lifecycle manager 1080 determines the VNF lifecycle state of any VNF within its control domain. Such determination is based on the lifecycle trigger, which may be the input 1081 from the orchestrator 361 to the lifecycle manager 1080, by way of non-limiting example, during initial service provisioning, or alternatively other A-S VNFs 122, via the SM/MM 350 by the inputs 1021 to the scheduler 1020 or to the lifecycle manager 1080 or both. This determination is made based on a policy stored in the policy enforcement component 1090.

Probabilistic Updater

Figure 11:
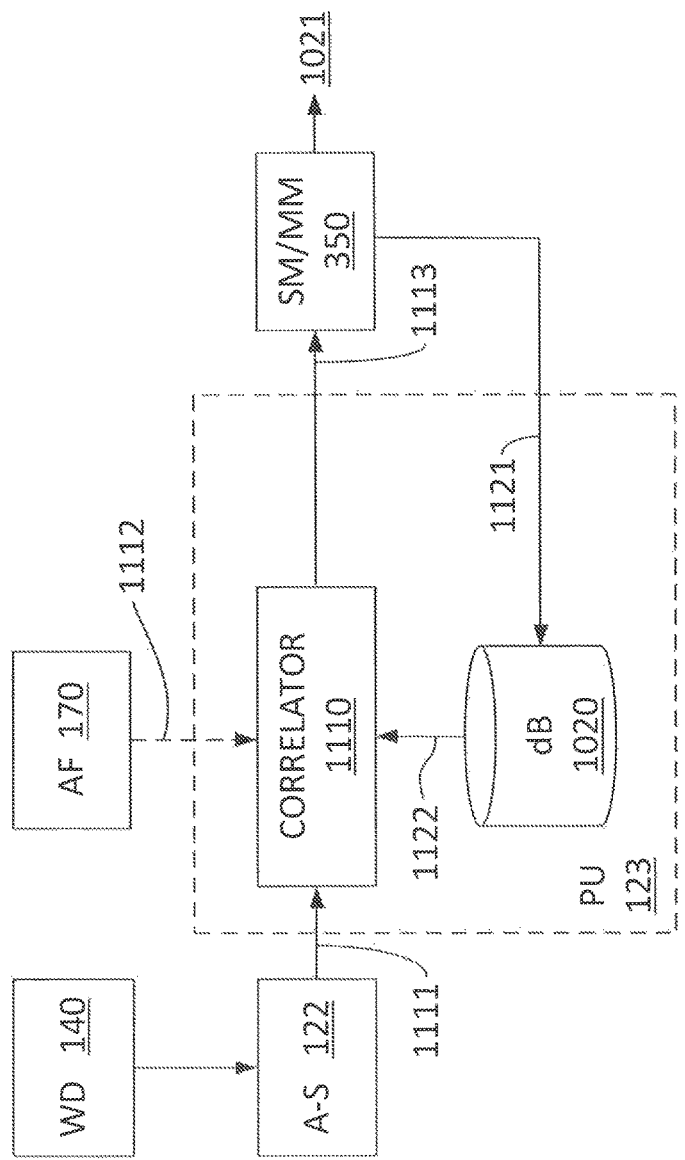
FIG. 11 is an example block diagram showing an example probabilistic updater (PU) in the context of the components of FIG. 3.

Turning now to FIG. 11, there is shown a block diagram of an example embodiment of the PU function 123. The PU function 123 accepts inputs from the A-S VNF 122 and from the SM/MM 350 and generates outputs to the SM/MM 350. In some example embodiments, the PU function 123 accepts inputs from the AF 170.

In some example embodiments, the PU function 123 comprises a correlator 1110 and a database 1120.

The correlator 1110 accepts data flow context information 1111 from the A-S VNF 122, database information 1122 from the database 1120 and optionally 1112 from the AF 170 and generates correlated information 1013 to the distributor 1020. The inputs 1111 represent data flow context information derived by the A-S VNF 122 from UL data flows 150 from the WD 140. By way of non-limiting example related to the mission-critical MEC use case described above, the UL data flows 150 may comprise data such as telemetry (positioning, velocity, acceleration), resource status, battery, armament, error conditions) and destination monitoring. From such UL data flows 150, the A-S VNF 122 derives data flow context information 1111 that may be appropriate for the generation of the probabilistic estimates by the PU function 123. In the context of the mission-critical MEC example scenario being discussed, this may comprise WD 140 coordinates, as well as sojourn time, speed and direction of the WD 140, at a desired granularity.

The correlator 1110 accepts such data flow context information 1111 and correlates it with database information 1122 from the database 1120, which may, in some example embodiments, comprise previous probabilistic estimates as well as mapping data showing waypoints, geographical features and/or the location of PoPs. In some example embodiments, some or all of the mapping data may be obtained from the AF 170 or other 3$^{rd}$ party application (not shown). The correlator 1110 reviews the correlated information and determines if the information calls for an updated probabilistic estimate, and if so, generates such probabilistic estimate(s) 1113. Such determination may revise probabilities or weights assigned to previously identified PoP candidates, reject one or more previously identified PoP candidates, identify one or more new PoP candidates or select one of the identified PoP candidates. In some example embodiments, this determination may employ statistical and/or probabilistic estimation methods including without limitation, Bayesian inference and/or maximum likelihood. The correlator 1110 forwards any updated probabilistic estimate 1113 to the SM/MM 350. In some example embodiments, the correlator 1110 may select one of the identified PoP candidates in accordance with a policy. In some example embodiments, the policy may compare the updated probabilistic estimate 1113 against a threshold value.

The SM/MM 350 accepts updated probabilistic estimates 1113 from the correlator 1110 and stores probabilistic estimate information 1121 in the database 1120 for later retrieval by the correlator 1110. Further, from time to time, as appropriate, the SM/MM 350 uses the updated probabilistic estimates 1113 to issue trigger inputs 1021 to the scheduler 1020 and/or to the lifecycle manager 1080.

Because during an Inter-PoP Domain handover both the AP 130, 135, 530 and the PoP 100, 201-205 housing the A-S VNF 122, 522, 762, 772 changes, there are different potential options for when the handover occurs relative to the scaling out of the A-S VNF 122, 522, 762, 772 and the prior scaling out of the associated VNF state 161, 560, 760, 771.

Option 1: Early Controller Function Handover

Figure 12:
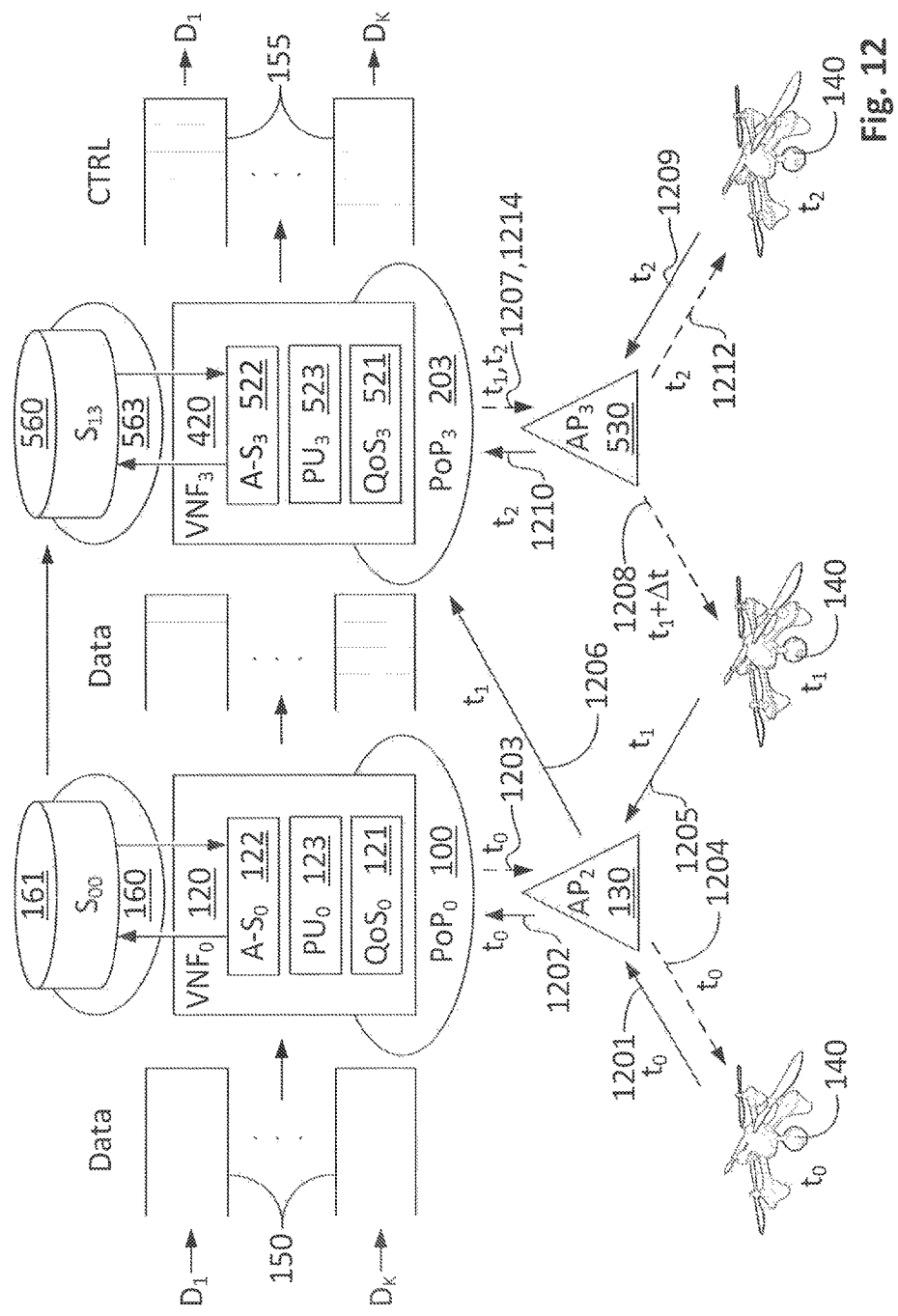
FIG. 12 is an example block diagram showing an example Early Controller Function Handover option of the inter-PoP domain handover scenario of FIG. 6.

A first option is shown in FIG. 12. The figure shows the WD 140 moving in time between a time, denoted $t_0$, when the WD 140 is associated with A-S VNFA-$S_{0}$, 122 scaled on PoP$_0$100 to a time, denoted $t_2$, when the WD 140 is associated with A-S VNFA-$S_3$ 522 scaled on PoP$_3$ 203, through an intermediate time, denoted $t_1$, when A-$S_3$ 522 has been activated and associated with AP$_3$ 530, but the WD 140 has not yet been formally handed over from AP$_2$ 135 associated with A-S VNF 122 to AP$_3$ 530 associated with A-S VNF 522. The time $t_1$ thus corresponds to the vertical area below flow 632 and above flow 637 in FIG. 6.

Consider first time $t_0$. When WD 140 has data to upload, it uploads the data 1201 to AP$_2$ 135, with which it still understands it is associated. AP$_2$ 135 forwards the data 1202 to A-$S_0$ 122 as previously described in FIG. 6 and eventually, control information and/or data is downloaded 1203 by A-$S_0$122 to AP$_2$ 135 and forwarded 1204 to WD 140.

At time $t_1$, when WD 140 has data to upload, it uploads the data 1205 to AP$_2$ 135, with which it still understands it is associated. AP$_2$135 however is aware that A-$S_3$ 522 has been scaled and that WD 140 is associated with it and not with A-$S_0$ 122. Accordingly, under the early controller function handover option, it forwards 1206 the uploaded data not to A-$S_0$122 but to A-$S_3$ 522. When control information and/or data is downloaded 1207 by A-$S_3$ 522, it is sent to AP$_3$ 530 and forwarded 1208 to WD 140. Upon receipt of this communication, WD 140 now understands that it is associated with AP$_3$ 530.

At time $t_2$, when WD 140 has data to upload, it uploads the data 1209 to AP$_3$ 530, with which it now understands it is associated. AP$_3$ 530 forwards the data 1210 to A-$S_3$ 523 and eventually, control information and/or data is downloaded 1211 by A-$S_3$ 523 to AP$_3$ 530 and forwarded 1212 to WD 140.

Such an option, denoted Early Controller Function Handover, is appropriate where the WD 140 has low mobility such that a rate of handover is expected to be lower than a rate of controller processing. However, such an option incurs substantial high volume traffic re-routing from the APs to the PoPs.

Option 2: Late Controller Function Handover

Figure 13:
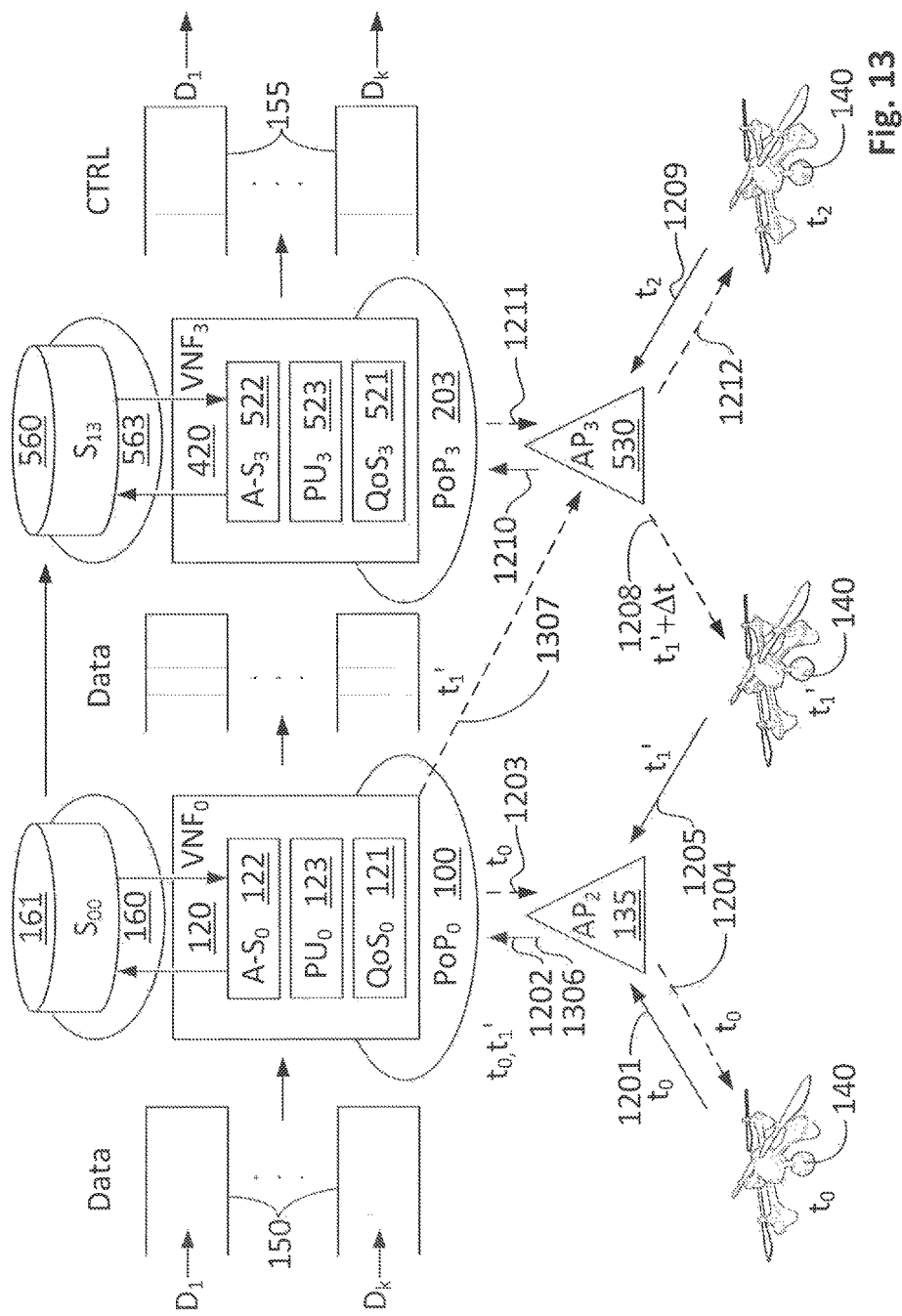
FIG. 13 is an example block diagram showing an example Late Controller Function Handover option of the inter-PoP domain handover scenario of FIG. 6.

A second option is shown in FIG. 13. The uploads by WD 140 at times $t_0$ and $t_2$ are processed in the same way as described with Early Controller Function Handover, namely flows 1201-1204 and 1209-1212 respectively.

However, this second option differs from the first option in its processing at time $t_1'$ when A-$S_3$ 522 may not yet have been activated and associated with AP$_3$ 530, and the WD 140 has thus not yet been formally handed over from AP$_2$ 135 associated with A-S VNF 122 to AP$_3$ 530 associated with A-S VNF 522. The time $t_1'$ thus corresponds to the vertical area above flow 632 and below flow 629 in FIG. 6.

Thus, at time $t_1'$, when WD 140 has data to upload, it uploads the data 1205 to AP$_2$ 135, with which it still understands it is associated. Under the late controller function handover option, AP$_2$ 135 forwards 1306 the uploaded data not to A-$S_3$ 522 but to A-$S_0$ 122. When control information and/or data is downloaded 1307 by A-$S_0$ 122, it is now sent to AP$_3$ 530 and forwarded 1208 to WD 140. Upon receipt of this communication, WD 140 now understands that it is associated with AP$_3$ 530.

Figure 14:
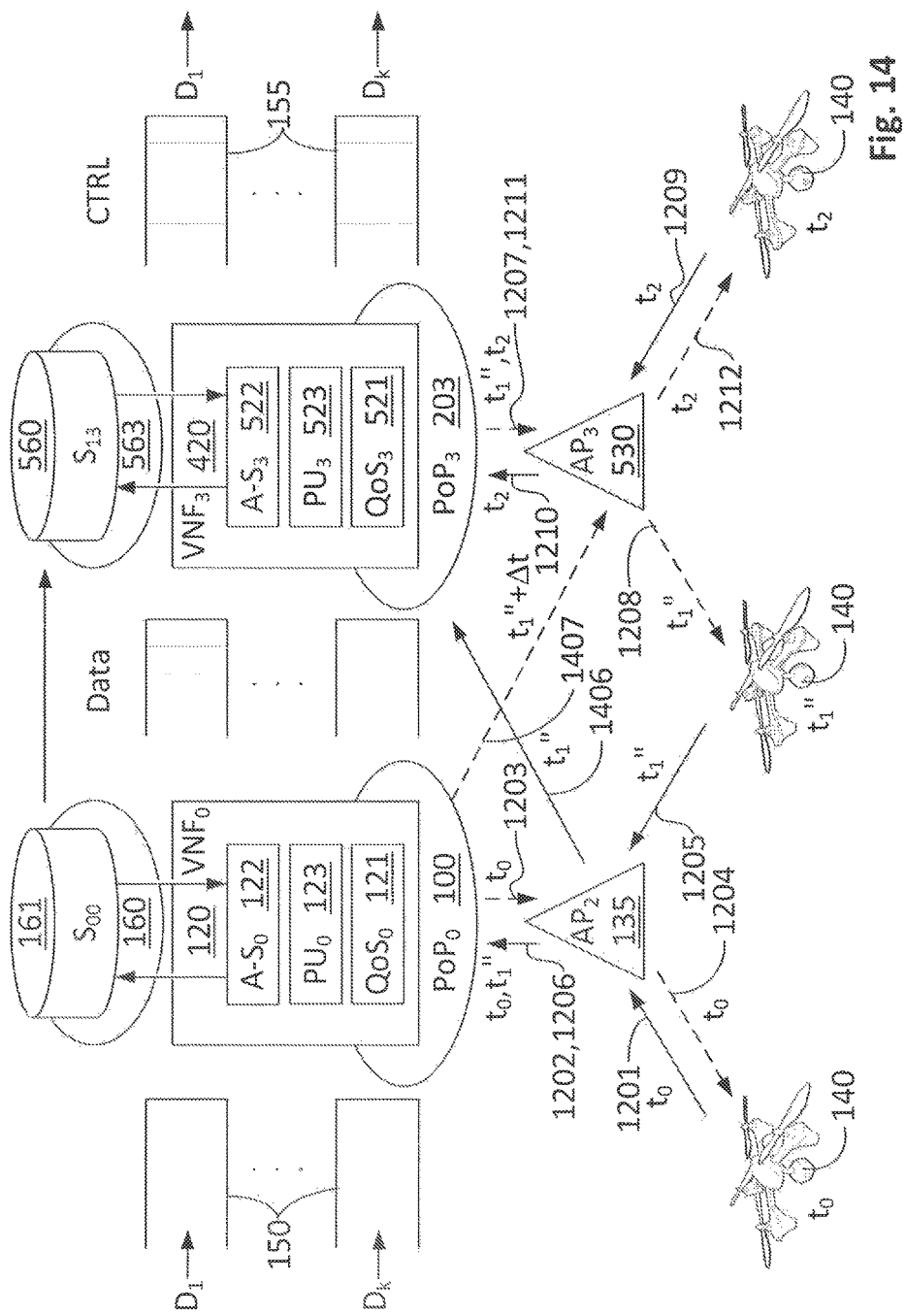
FIG. 14 is an example block diagram showing an example hybrid option of the inter-PoP domain handover scenario of FIG. 16.

Such an option, denoted Late Controller Function Handover, is appropriate where the WD 140 has high mobility such that the rate of handover is expected to be higher than the rate of controller processing and state migration. However, such an option risks that the destination VNF may not be sufficiently trained at handover, due to the late VNF handover Option 3: Hybrid Approach A third option, which is a hybrid of the Early Controller Function Handover and Late Controller Function Handover approaches, is shown in FIG. 14.

The uploads by WD 140 at times $t_0$ and $t_2$ are processed in the same way as described with Early Controller Function Handover, namely flows 1201-1204 and 1209-1212 respectively.

However, this third option differs from the first option in its processing at time $t_1''$. In the hybrid approach, the UL data flows from the WD 140 are multicast from AP$_0$ 135 to both A-$S_0$ 122 and A-$S_3$ 522 and DL control information is sent from both A-$S_0$ 122 and A-$S_3$ 522 to AP$_3$ 530. The multicast allows A-$S_3$ 522 to be trained while processing received data before handover. If A-$S_3$ 522 completes processing while WD 140 remains in the coverage of AP$_3$ 530, the control information and/or data is sent by A-$S_3$ 522. Otherwise, it is sent by A-$S_0$ 122. In the meantime, the updated state $S_{00}$ 161 of A-$S_0$ 122 is not scaled to state $S_{13}$ 560 of A-$S_3$ 522 until it is appropriate, thus providing a level of redundancy. In effect, a decision where and when to on-board, instantiate, configure, activate and ultimately deactivate the A-S VNF 522 is made not only based upon the probabilistic estimate(s) provided by the PU function 123 based on the context of the WD 140, but also on considerations external to the WD 140, such as processing capability of the A-S VNF 522 and network loading conditions.

Thus, at time $t_1''$, when WD 140 has data to upload, it uploads the data 1205 to AP$_2$ 135, with which it still understands it is associated. Under the hybrid controller function handover option, AP$_2$ 135 forwards 1206 the uploaded data to A-$S_0$ 122 and/or 1406 to A-$S_3$ 522. When control information and/or data is downloaded, it is downloaded 1407 by either or both of A-$S_0$ 122 and 1207 by A-$S_3$ 522 to AP$_3$ 530 and forwarded 1208 to WD 140. Upon receipt of this communication, WD 140 now understands that it is associated with AP$_3$ 530.

Method Actions

Figure 15:
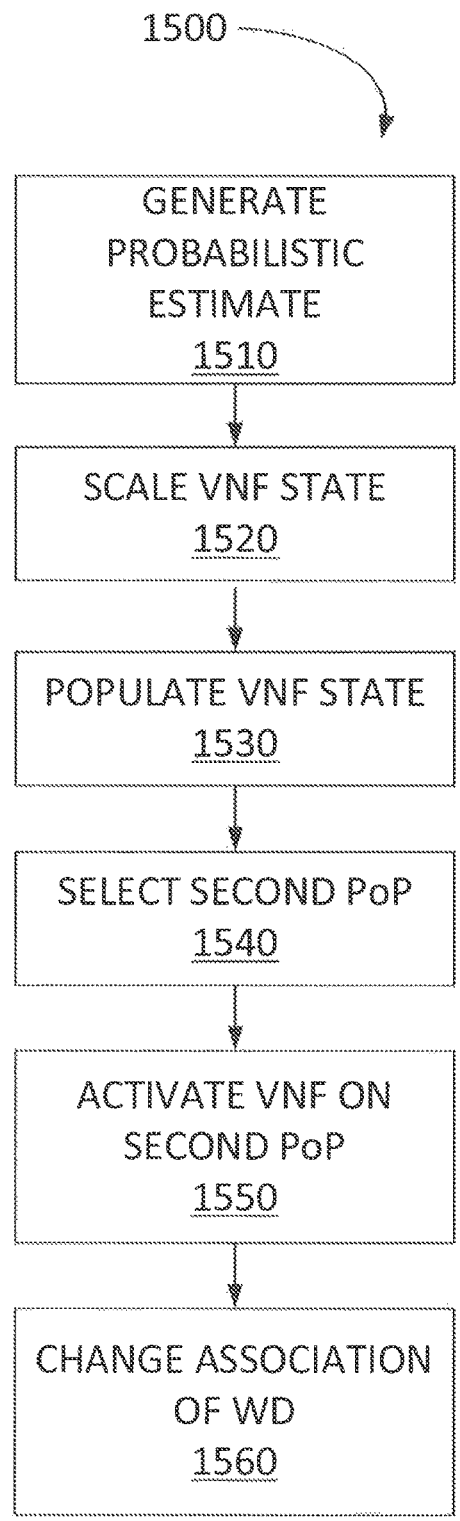
FIG. 15 is a flow chart showing method actions according to an example embodiment of the present disclosure.

Turning now to FIG. 15, there is shown a flow chart, shown generally at 1500, showing example actions taken by a processor to scale a VNF 120 on a first PoP 100 supporting at least one WD 140 associated therewith to a second PoP 203 to whom the association of the at least one WD 140 will be changed.

One example action 1510 is to generate a probabilistic estimate of a likelihood that the association of the at least one WD will be changed to at least one candidate PoP PoP$_2$202, PoP$_3$203.

One example action 1520 is to scale a VNF state $S_{12}$ 561, $S_{13}$ 560 associated with the at least one candidate PoP$_2$ 202, PoP$_3$ 203.

One example action 1530 is to populate the VNF state $S_{12}$ 561, $S_{13}$ 560 associated with state context information related to the change of association of the at least one WD 140 from the first PoP$_0$ 122 to the at least one candidate PoP$_2$ 202, PoP$_3$ 203.

One example action 1540 is to select the second PoP$_3$ 203 from the candidate PoPs PoP$_2$ 202, PoP$_3$ 203 prior to changing the association of the at least one WD 140 from the first PoP$_0$ 100, using the probabilistic estimate.

One example action 1550 is to activate a VNF$_3$ 420 on the second PoP$_3$ 203 established from the first PoP$_0$ 100 after the action of populating.

One example action 1560 is to change the association of the at least one WD 140 from the first PoP$_0$ 100 to the second PoP$_3$ 203 after the action of activating.

Example Device

Having described in detail example embodiments that are in accordance with the present disclosure, it is noted that the embodiments reside primarily in combinations of apparatus or devices and processing actions related to interactions between one or more of such components.

Figure 16:
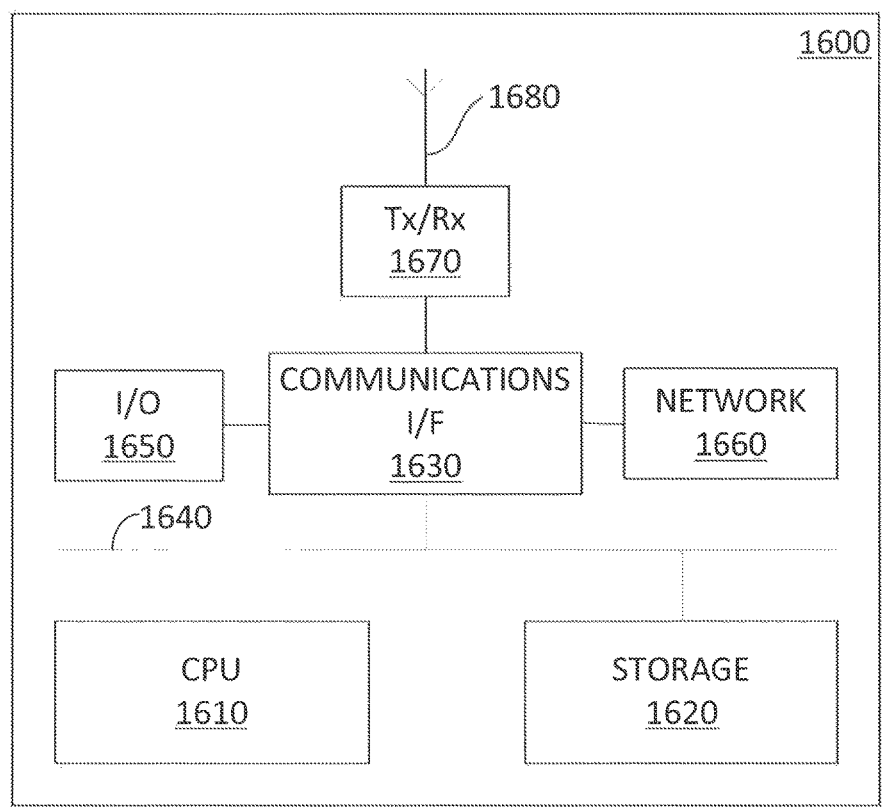
FIG. 16 is a schematic view of a processing system according to an example embodiment of the present disclosure.

FIG. 16 is a block diagram of a processing system that may be used for implementing one or more devices, shown generally at 1600, such as the PoP 100, 201-205 for performing actions in one or more of the methods disclosed herein.

The device 1600 comprises a processing unit 1610, a storage medium 1620 and a communications interface 1630. In some example embodiments, the device 1900 may also comprise a processing bus 1640 interconnecting some or all of these components, as well as other devices and/or controllers. In some example embodiments, the device 1600 may comprise an input/output (I/O) device 1650, a network connectivity device 1660, a transceiver 1670 and/or an antenna 1680.

The processing unit 1610 controls the general operation of the device 1600, by way of non-limiting example, by sending data and/or control signals to the communications interface 1630, and by retrieving data and/or instructions from the storage medium 1620 to execute method actions disclosed herein.

However configured, the hardware of the processing unit 1610 is configured so as to be capable of operating with sufficient software, processing power, memory resources and network throughput capability to handle any workload placed upon it.

The storage medium 1920 provides storage of data used by the device 1600, as described above.

The storage medium 1620 may also be configured to store computer codes and/or code sequences, instructions, configuration information, data and/or scripts in a computer program residing on or in a computer program product that, when executed by the processing unit 1610, causes the processing unit 1610 to perform one or more functions associated with the device 1600, as disclosed herein.

The communications interface 1630 facilitates communication with the I/O device(s) 1650, network connectivity device(s) 1660 and/or other entities in a communications network. In some example embodiments, the communications interface 1630 is for connection to a transceiver 1670, which may comprise one or more transmitters and/or receivers, and at least one antenna 1680, through which such communications are effected. As such, the communications interface 1630 may comprise one or more interfaces and a suitable number of ports, to couple internal and external I/O devices 1650, network connectivity devices and the like to the processing unit 1610.

Network connectivity devices 1660 may enable the processing unit 1610 to communicate with the internet or one or more intranets (not shown) to communicate with remote devices, for data processing and/or communications. The network connectivity devices 1660 may also comprise and/or interface with one or more transceivers 1670 for wirelessly or otherwise transmitting and receiving signals. With such a network connection, it is contemplated that the processing unit 1610 may receive information from the network or might output information to the network in the course of performing one or more of the above-described method actions.

The transceiver 1670 operates to prepare data to be transmitted and/or to convert received data for processing by the processing unit 1610.

Other components, as well as related functionality of the device 1600, may have been omitted in order not to obscure the concepts presented herein.

Figure 17:
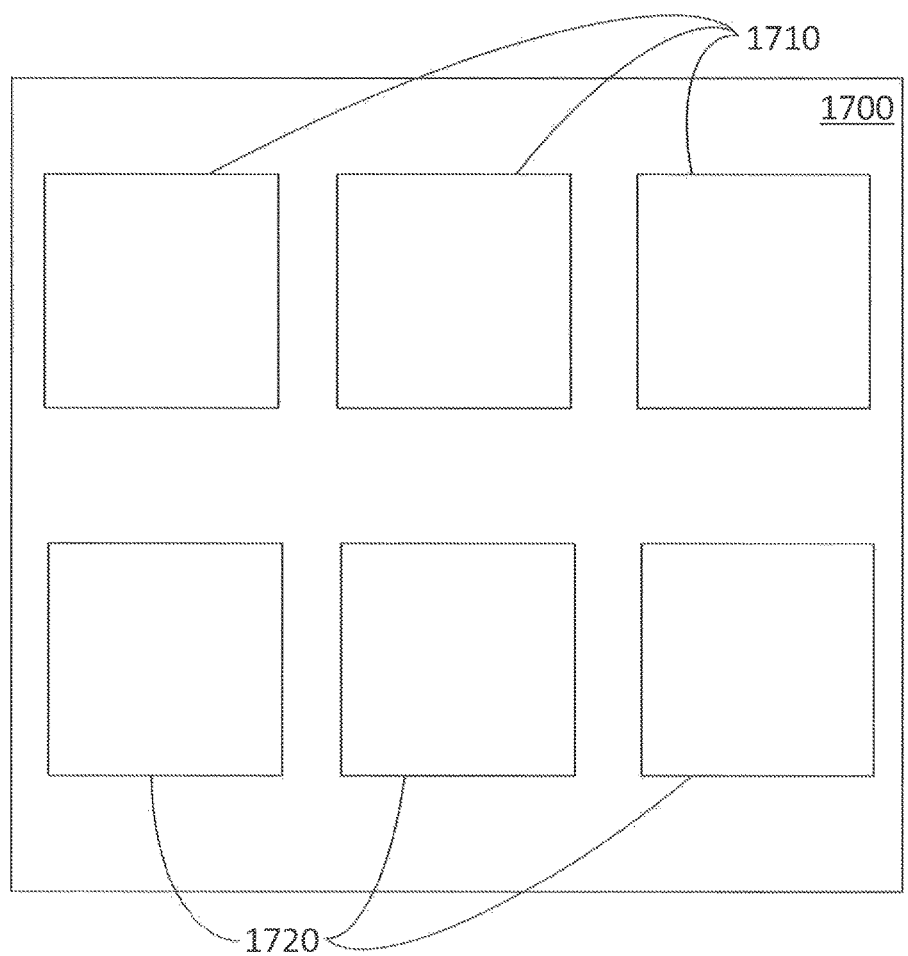
FIG. 17 is a schematic view of a functional unit according to an example embodiment of the present disclosure.

Turning now to FIG. 17, there is shown a schematic view, in terms of some of its functional aspects, the components of a function, shown generally at 1700. The controller 1700 comprises a number of functional units, referred to generically as 1710, according to an example embodiment. The controller 1700 may further comprise a number of other functional units, referred to generally as 1720. Each functional unit 1710 will be identified below and its functionality further discussed below as well as the context in which the functional units 1710 may be used.

Those having ordinary skill in the relevant art will appreciate that other instructions and operations to implement the described techniques and methods may also be stored on the storage medium 1620. Software running from the storage medium 1620 may interface with circuitry to perform the described techniques and method actions.

In some example embodiments, the function 1700 may be a VNF state scaling manager 1000, in which case the functional units 1710 may comprise a pre-processor 1010, a scheduler 1020, a post-processor 1030 and/or a VNF state analyzer 1040.

In some example embodiments, the function 1700 may be a VNFM 363 comprising such functional units 1710 as described above and comprising a lifecycle manager 1080 and/or a policy module 1090.

In some example embodiments, the function 1700 may be a PU function 123, in which case the functional units 1710 may comprise a correlator 1110 and/or a database 1120.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether electrically, mechanically, chemically, or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of the device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which is described by the claims and not by the implementation details provided, which can be modified by omitting, adding or replacing elements with equivalent functional elements, provides many applicable inventive concepts that may be embodied in a wide variety of specific contexts. The specific embodiments discussed are merely illustrative of specific ways to make and use the disclosure, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims.

The invention claimed is:

1. A method for scaling a virtual network function (VNF) activated on a first point of presence (PoP) associated with at least one wireless device (WD), the VNF having a first VNF state comprising state-life information associated with the VNF on the first PoP, the method comprising:
 generating at least one probabilistic estimate of a likelihood that the association of the at least one WD will be changed to at least one candidate PoP;

proactively scaling a second VNF state on a PoP associated with the at least one candidate PoP, the second VNF state based upon the first VNF state and comprising state-life information associated with a possibility of activating the VNF on the at least one candidate PoP;

proactively selecting the at least one candidate PoP using the probabilistic estimate;

activating a VNF on the at least one candidate PoP after said selecting using the second VNF state; and changing the association of the at least one WD to the at least one candidate PoP after said activating.

2. The method according to claim 1, wherein the second VNF state comprises state context information related to said changing the association.

3. The method according to claim 1, wherein the action of generating comprises obtaining information related to a trajectory of the at least one WD from the VNF on the first PoP.

4. The method according to claim 3, wherein the action of generating comprises correlating the trajectory information with information related to the at least one candidate PoP.

5. The method according to claim 1, wherein the action of proactively scaling a VNF state comprises performing an action selected from a group consisting of on-boarding, instantiating, configuring, activating and any combination of any of these, in respect of a VNF on a PoP associated with the at least one candidate PoP.

6. The method according to claim 5, wherein the VNF state is an external VNF scaled onto the PoP associated with the at least one candidate PoP.

7. The method according to claim 5, wherein the PoP associated with the at least one candidate PoP and the at least one candidate PoP are the same.

8. The method according to claim 7, wherein the VNF state is a component of the VNF that is scaled from the first PoP to the at least one candidate PoP.

9. The method according to claim 2, wherein the action of scaling comprises decomposing state context information of the first VNF state into a plurality of fragments and forwarding at least one fragment to the second VNF state.

10. The method according to claim 2, wherein the action of scaling comprises assembling a plurality of fragments of the state context information forwarded to the second VNF state into a state context for the at least one candidate PoP.

11. The method according to claim 1, wherein the action of selecting comprises comparing the probabilistic estimate of the at least one candidate PoP against a policy.

12. The method according to claim 11, wherein the policy comprises a threshold value such that the at least one candidate PoP is selected if its probabilistic estimate exceeds the threshold value.

13. The method according to claim 1, further comprising the action of deactivating the VNF on the first PoP.

14. The method according to claim 1, wherein the association of the at least one WD to a PoP is through an access point (AP).

15. The method according to claim 14, wherein the change of association comprises handing over the at least one WD from an AP associated with the first PoP to an AP associated with the at least one PoP.

* * * * *